US012066929B2

(12) United States Patent
Shveidel et al.

(10) Patent No.: US 12,066,929 B2
(45) Date of Patent: Aug. 20, 2024

(54) TECHNIQUES FOR EFFICIENT ADDRESS TRANSLATION USING METADATA WITH MIXED MAPPING SCHEMES

(71) Applicant: Dell Products L.P., Hopkinton, MA (US)

(72) Inventors: Vladimir Shveidel, Pardes-Hana (IL); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 95 days.

(21) Appl. No.: 17/866,912

(22) Filed: Jul. 18, 2022

(65) Prior Publication Data

US 2024/0020225 A1  Jan. 18, 2024

(51) Int. Cl.
    G06F 12/02    (2006.01)
(52) U.S. Cl.
    CPC .. *G06F 12/0246* (2013.01); *G06F 2212/7201* (2013.01)
(58) Field of Classification Search
    CPC ......... G06F 12/0246; G06F 2212/7201; G06F 12/1009
    See application file for complete search history.

(56) References Cited

U.S. PATENT DOCUMENTS

| 8,234,650 B1* | 7/2012 | Eppstein | G06F 9/5072 718/100 |
| 2015/0100720 A1* | 4/2015 | Flynn | G06F 13/4022 711/103 |
| 2021/0081388 A1* | 3/2021 | Ding | G06F 16/1734 |
| 2021/0096745 A1* | 4/2021 | Ro | G06F 3/0659 |

OTHER PUBLICATIONS

U.S. Appl. No. 17/239,021, filed Apr. 23, 2021, entitled System and Method for Implementing Mapper Metadata as a Log-Structured System, to Vamsi K. Vankamamidi, et al.

* cited by examiner

*Primary Examiner* — Chie Yew
(74) *Attorney, Agent, or Firm* — Muirhead and Saturnelli, LLC

(57) ABSTRACT

Techniques for address translation can include: performing first processing that maintains a first storage tier including first metadata pages of a hierarchical structure, and performing second processing that maintains a second storage tier including second metadata pages of the hierarchical structure. The first processing can include storing updated versions of the first metadata pages in place at static physical addresses of the first storage tier. The second processing can include storing updated versions of the second metadata pages at new physical storage locations. Prior to updating the second metadata pages, prior versions of the second metadata pages can be stored at other physical storage locations of the second storage tier, where the other physical storage location are different from the new physical storage locations. The first storage tier can be a non-parity RAID configuration such as RAID-1. The second storage tier can be a parity configuration such as RAID-5.

17 Claims, 19 Drawing Sheets

1550

1508b

Processing to establish the mapping information for the write I/O operation can include updating one or more MD pages of the chain such as to update an entry of one of the MD pages to reference the next MD page in the chain.

Updating the MD top or mid page can include determining an updated version of the MD page. If the MD top or mid page is stored in cache, the current version of the MD page can be obtained from cache. If the MD top or mid page is not stored in cache, the current version of the MD page (which either a top or mid MD page) can be read from an existing physical storage location of the non-parity RAID configured storage tier 1110. The updated version of the top or mid MD page can be written to the tier 1110 so that the MD page is updated "in place" by overwriting the existing physical storage location in the tier 1110. The updated MD page (either a top or mid MD page) can be stored in the cache.

Updating the MD leaf page can include determining an updated version of the MD leaf page with one or more metadata updates applied to the current version of the MD leaf page. If the MD leaf page is stored in cache, the current version of the MD leaf page can be obtained from cache. If the MD leaf page is not stored in cache, the current version of the MD leaf page can be read from an existing physical storage location of the parity RAID configured storage tier 1120. The updated version of the MD leaf page can be written to a new physical storage location that is different than the existing physical storage location. The updated version of the MD leaf page does not overwrite the existing physical storage location in the tier 1120. The updated MD leaf page can also be stored in the cache.

Deduplication can be performed to determine whether the new content C1 written by the write I/O is a duplicate of existing content C2. If C1 is a duplicate of existing content C2 already stored at an existing block B1 of non-volatile storage, the VLB entry E14 of the chain of mapping information can be used to access the existing content C2, where E14 can reference or point to B1. If C1 is not a duplicate of any existing content C2 and is therefore new unique content, C1 can be stored in a new data block B2 of non-volatile storage, where E14 can reference or point to B2. Thus, the VLB entry E14 either references the existing data block B1 (e.g., C1 is deduplicated), or references the new data block B2 (e.g., C1 is unique and not deduplicated).

1508c

In response to updating the MD leaf page stored in the new physical storage location, processing can update one or more entries of one or more MD mid pages which reference the MD leaf page so that such entries of the MD mid pages reference corresponding new physical storage locations of the relocated and updated MD leaf page.

FIG. 14B

TECHNIQUES FOR EFFICIENT ADDRESS TRANSLATION USING METADATA WITH MIXED MAPPING SCHEMES

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. Processing can include: performing first processing that maintains a first storage tier including a first plurality of metadata (MD) pages included in a hierarchical structure, wherein said first processing includes: determining an updated version of a first MD page of the first plurality of MD pages, wherein an existing version of the first MD page is stored at a first storage location of the first storage tier; and storing the updated version of the first MD page at the first storage location of the first storage tier; and performing second processing that maintains a second storage tier including a second plurality of MD pages included in the hierarchical structure, wherein said second processing includes: determining an updated version of a second MD page of the second plurality of MD pages, wherein an existing version of the second MD page is stored at a second storage location of the second storage tier; and storing the updated version of the second MD page at a new storage location of the second storage tier, wherein the new storage location denotes a different physical storage location than the second storage location.

The first processing can manage and maintain the first storage tier in accordance with an update in place policy where each of the first plurality of MD pages is stored at a fixed or static address in the first storage tier, and wherein each updated version of said each MD page is rewritten to the fixed or static address of said each MD page. The first storage tier can be configured as a non-parity RAID configuration of one or more RAID groups. The first storage tier can be configured as a RAID-1 storage tier of one or more RAID-1 groups. The second processing can manage and maintain the second storage tier in accordance with a log structure system policy where each updated version of each of the second plurality of MD pages can be rewritten to an updated physical storage location of the second storage tier, and wherein the updated physical storage location can be different from an existing physical storage of the second storage tier where a prior version of said each MD page is stored prior to being updated. The second storage tier can be a configured as a parity RAID configuration of one or more RAID groups. The second storage tier can be configured as a RAID-5 storage tier of one or more RAID-5 groups.

In at least one embodiment, the hierarchical structure including the first plurality of MD pages and the second plurality of MD pages can be used in connection with mapping logical addresses to physical locations or addresses of content stored at the logical addresses. The first plurality of MD pages can include a plurality of MD top pages and a plurality of MD mid pages, and wherein the second plurality of MD pages can include a plurality of MD leaf pages. A first logical address can be mapped to a first non-volatile storage location including first content stored at the first logical address. The first logical address can be mapped by mapping information including a first chain of MD pages of the hierarchical structure, wherein the first chain can include a first of the MD top pages, a first of the MD mid pages, and a first of the MD leaf pages. A first entry of the first MD top page can reference a second entry of the first MD mid page, and wherein the second entry can reference a third entry of the first MD leaf page, and wherein the first MD top page, the first MD mid page and the first MD leaf page can be associated with corresponding logical address ranges including the first logical address. The third entry of the first MD leaf page can reference a fourth entry of a virtual layer block (VLB), and wherein the fourth entry can reference a first non-volatile storage location included the first content stored at the first logical address.

In at least one embodiment, processing can include: receiving a write I/O operation that writes new content to the first logical address, wherein the write I/O operation overwrites the first content of the first logical address with the new content; and updating the first chain of MD pages to reference the new content rather than the first content, wherein said updating the first chain of MD pages. Updating the first chain of MD pages can further comprise: updating an existing version of the first MD leaf page stored at a first existing physical storage location of the second storage tier, wherein said updating the existing version of the first MD leaf page includes updating the third entry of the first MD leaf page to reference another entry of a second VLB used to access the new content rather than the first content; determining, in accordance with said updating the existing version of the first MD leaf page, an updated version of the first MD leaf page; storing the updated version of the first MD leaf page at a second new physical storage location of the second storage tier, wherein the second new physical storage location denotes a different physical storage location than the first existing physical storage location in the second storage tier, wherein prior to said storing the updated version of the first MD leaf page, the third entry is located at a third physical storage location of the second storage tier, and after said storing the updated version of the first MD leaf page, the third entry of the first MD leaf page is located at a fourth physical storage location of the second storage tier; and updating the second entry of the first MD mid page to reference the fourth physical storage location of the second storage tier rather than the third physical storage location of the second storage tier. The fourth physical storage location can reference the another entry of the second VLB used to access the new content.

In at least one embodiment, processing can include determining an active data set of one or more volumes of user data; and selectively caching, in a cache, a portion of the first plurality of MD pages corresponding to the active data set, wherein a second portion of the first plurality of MD pages corresponds to one or more other volumes of user data, wherein the one or more other volumes are not included in the active data set, and wherein the second portion of the first plurality of MD pages is not stored in the cache.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 12, 13, 14A, 14B and 15 are flowcharts of processing steps that can be performed in at least one embodiment in accordance with the techniques of the present disclosure.

DETAILED DESCRIPTION OF EMBODIMENT(S)

Figure 1:
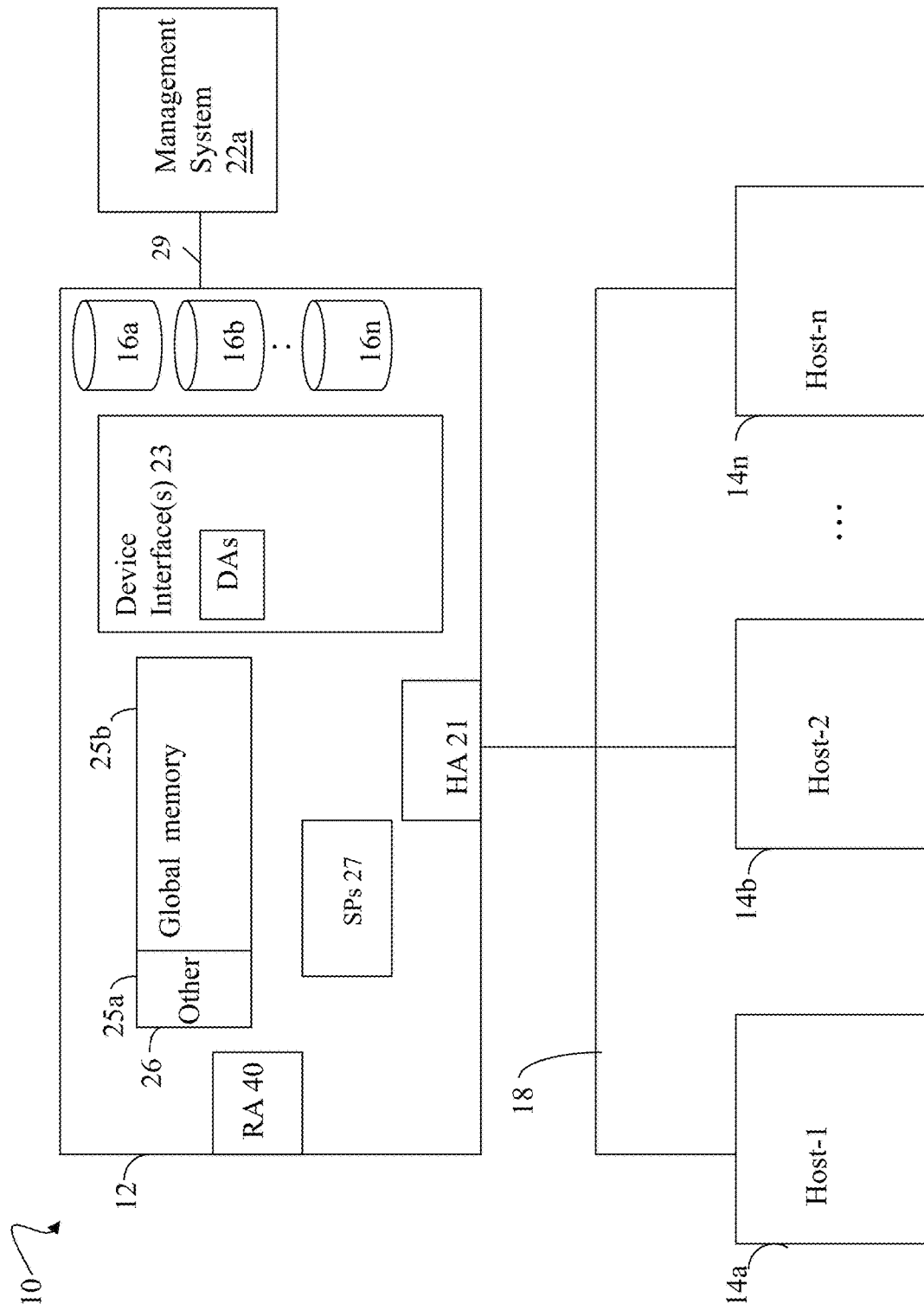
FIG. 1 is an example of components that may be included in a system in accordance with the techniques of the present disclosure.

A data storage system can use a log for recording user or client updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include updating the corresponding MD pages which map the logical address to its corresponding BE PD location including the content stored at the logical address. In at least one existing system, the mapping information including MD pages can thus be updated. For example, such updating of the mapping information can include updating a chain of MD pages used in connection with mapping the logical address to the BE PD location including the content stored at the logical address.

In at least one existing implementation, updating the corresponding mapping information and MD pages can include loading all the MD pages into the cache if any such MD pages are not already in cache. The MD pages of the mapping information can be characterized as a chain forming an access sequence including a top MD page, a mid MD page, and a leaf MD page, where each MD page in the sequence is accessed serially and also in the strict sequential order of the sequence.

The data storage system can maintain the user data or client data as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

The MD pages used in connection with mapping information as noted above can be implemented in a non-LSS where in-place updates or overwrites are typically performed when a MD page is updated. The physical storage location (e.g., on BE PDs) of each MD page can remain static or fixed so that in-place updates overwrite the same existing physical storage location of the MD page.

As an alternative, the storage used for storing the MD pages can be maintained as an LSS in a manner similar to the LSS storing user data or content. With an LSS for MD pages, an updated MD page can be determined as a result of applying one or more entries of the metadata log which update the MD page. A current version of the MD page (before applying the updates) can be stored at an existing physical storage location (e.g., on BE PDs). The updated version of the MD page can be determined and then stored at a new physical storage location that is different from the existing physical storage location. Thus, the physical storage of the MD page can move or change each time an updated version of the MD page is written to the BE PDs, where such updated version of the MD page can be the result of flushing one or more entries from the metadata log which update the same MD page, and then persistently storing the updated version of the MD page on the BE PDs. A MD page can be allocated from the BE PDs and assigned a logical address which can be mapped to a physical address or storage location on the BE PDs where the MD page is stored. Thus, as the MD page is updated and its corresponding physical storage location changes over time, the logical address of the MD page can remain the same. When the logical address of the MD page is used to reference the MD page from the BE PDs, the logical address of the MD page can be translated or mapped to its current physical storage location on the BE PDs. Thus, designing an LSS for storing the MD pages can generally include some form of dynamic translation of logical to physical addresses or locations for the MD pages. Designing a system which provides such dynamic address translation in an LSS for MD pages where the physical storage locations of the MD pages can change as updated can be a challenging task as discussed in more detail elsewhere herein.

Accordingly, described herein are techniques that provide efficient address translation for metadata in a log structured storage system using mixed or multiple mapping schemes. In at least one embodiment, the techniques of the present disclosure provide an efficient solution utilizing metadata of the mapping information to map a user or client logical address to a corresponding storage location including content stored at the user or client logical address. In at least one embodiment, the non-volatile storage for the MD pages can be managed and maintained using a combination of in-place updates or overwriting as well an LSS-based approach. In at least one embodiment, in-place updates or overwriting can be used for a first portion of the MD pages, and an LSS-based approach can be used for a second portion of the MD pages. With the LSS-based approach, an updated version of a MD page can be written to a new physical storage location each time a new updated version of the MD page is persistently stored.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
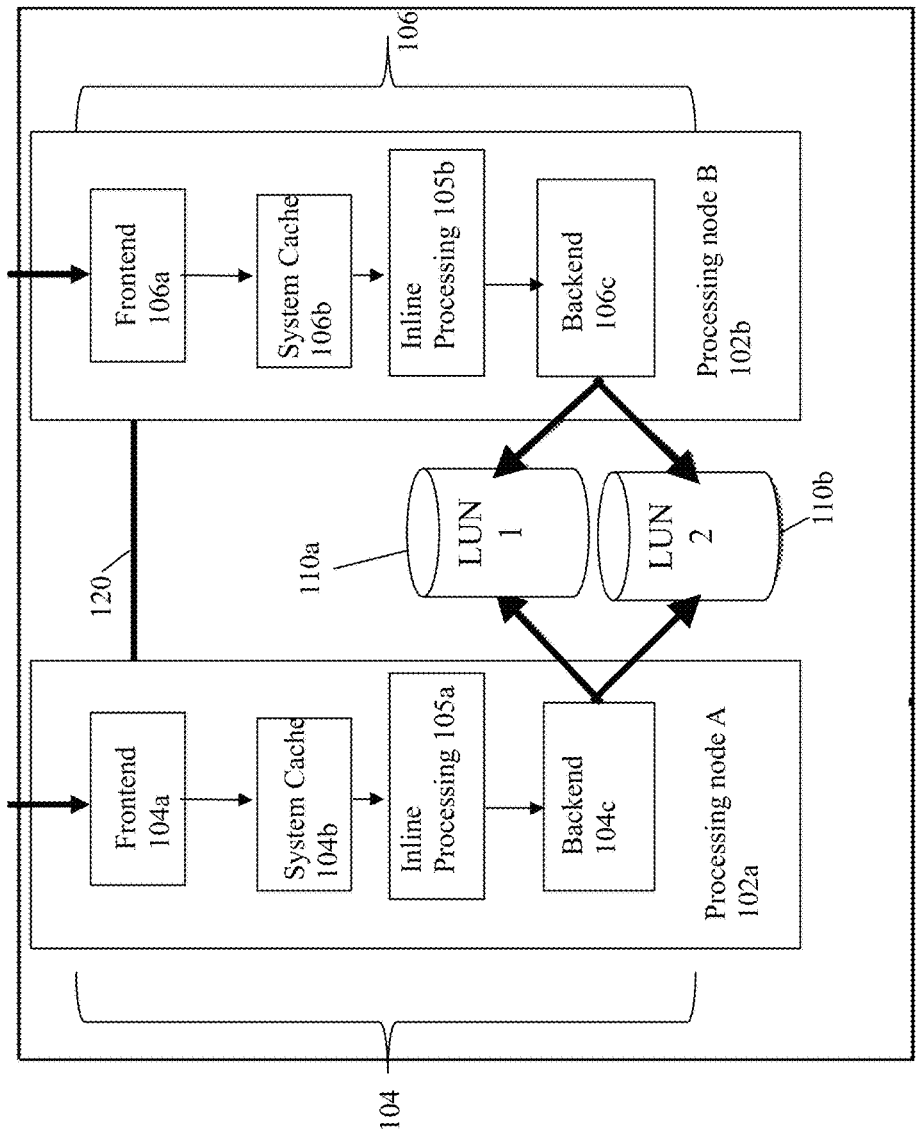
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
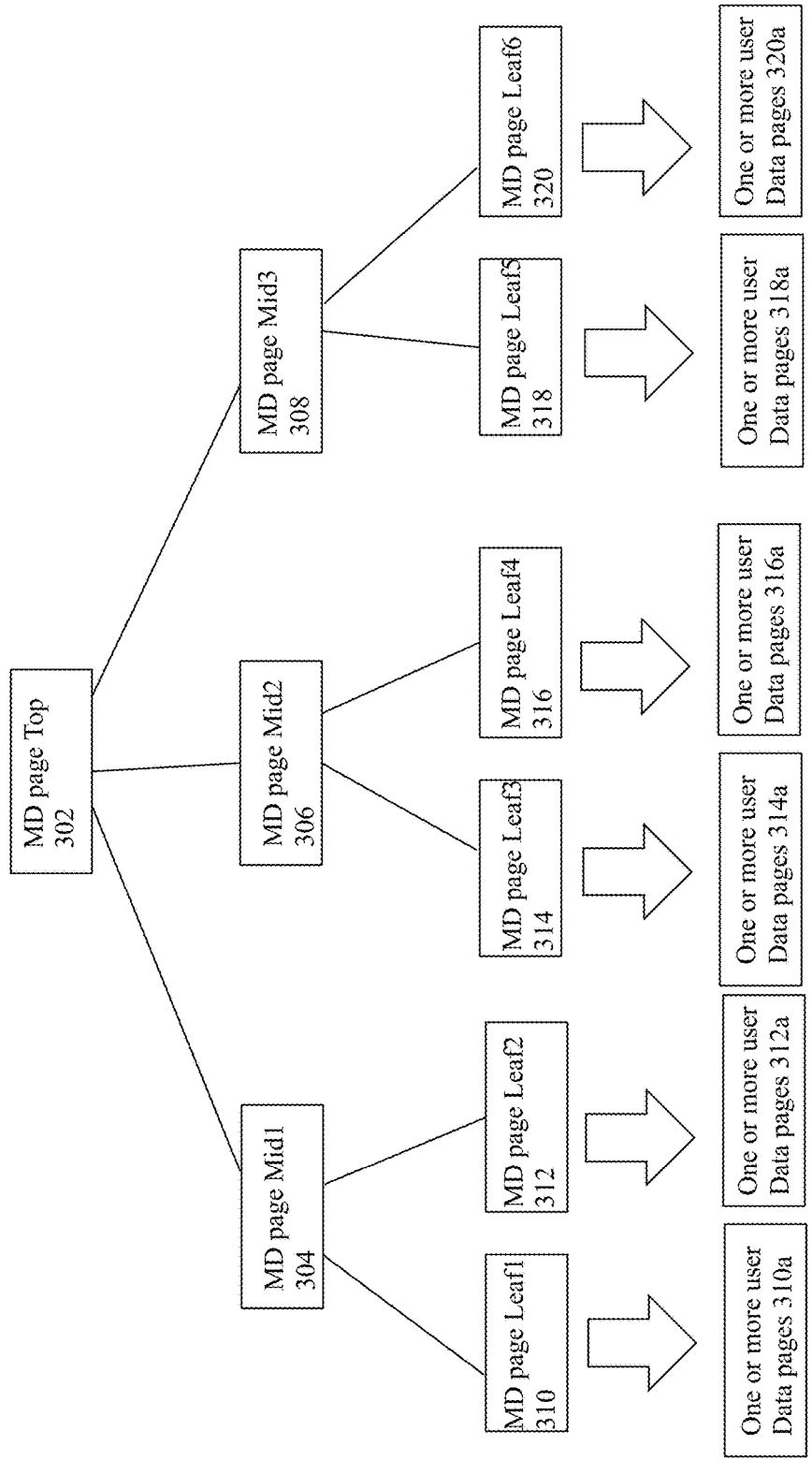
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
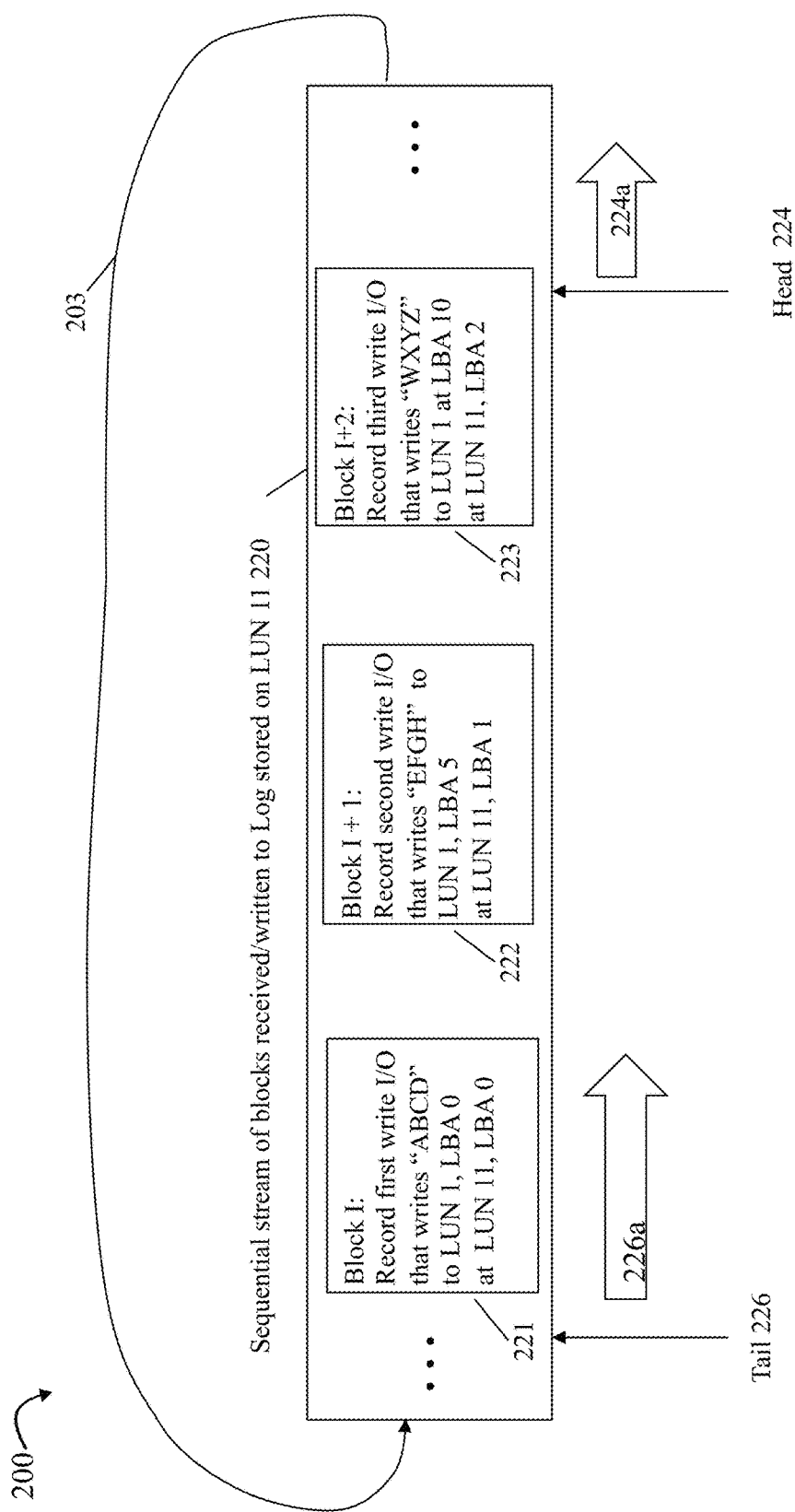
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
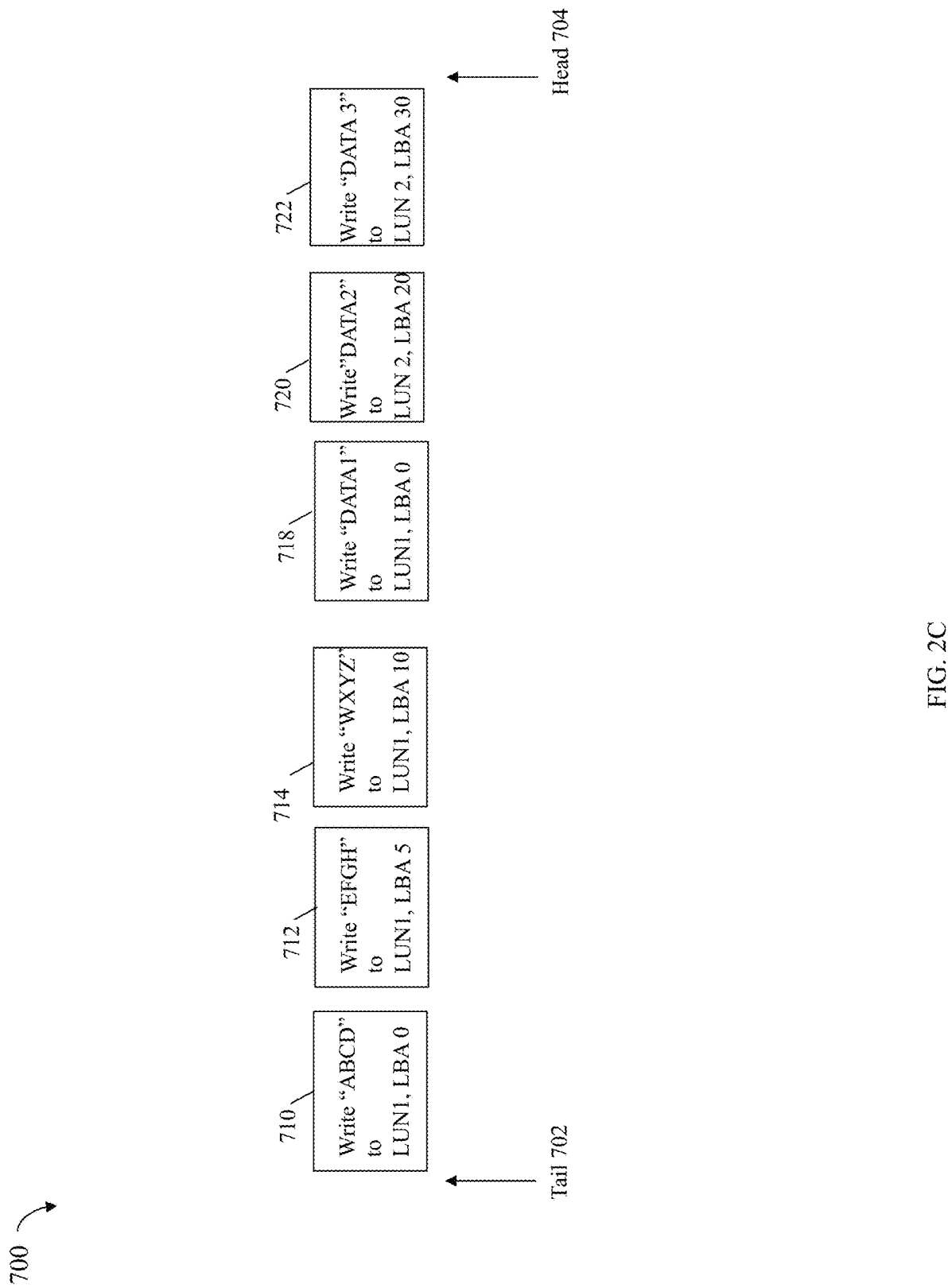

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
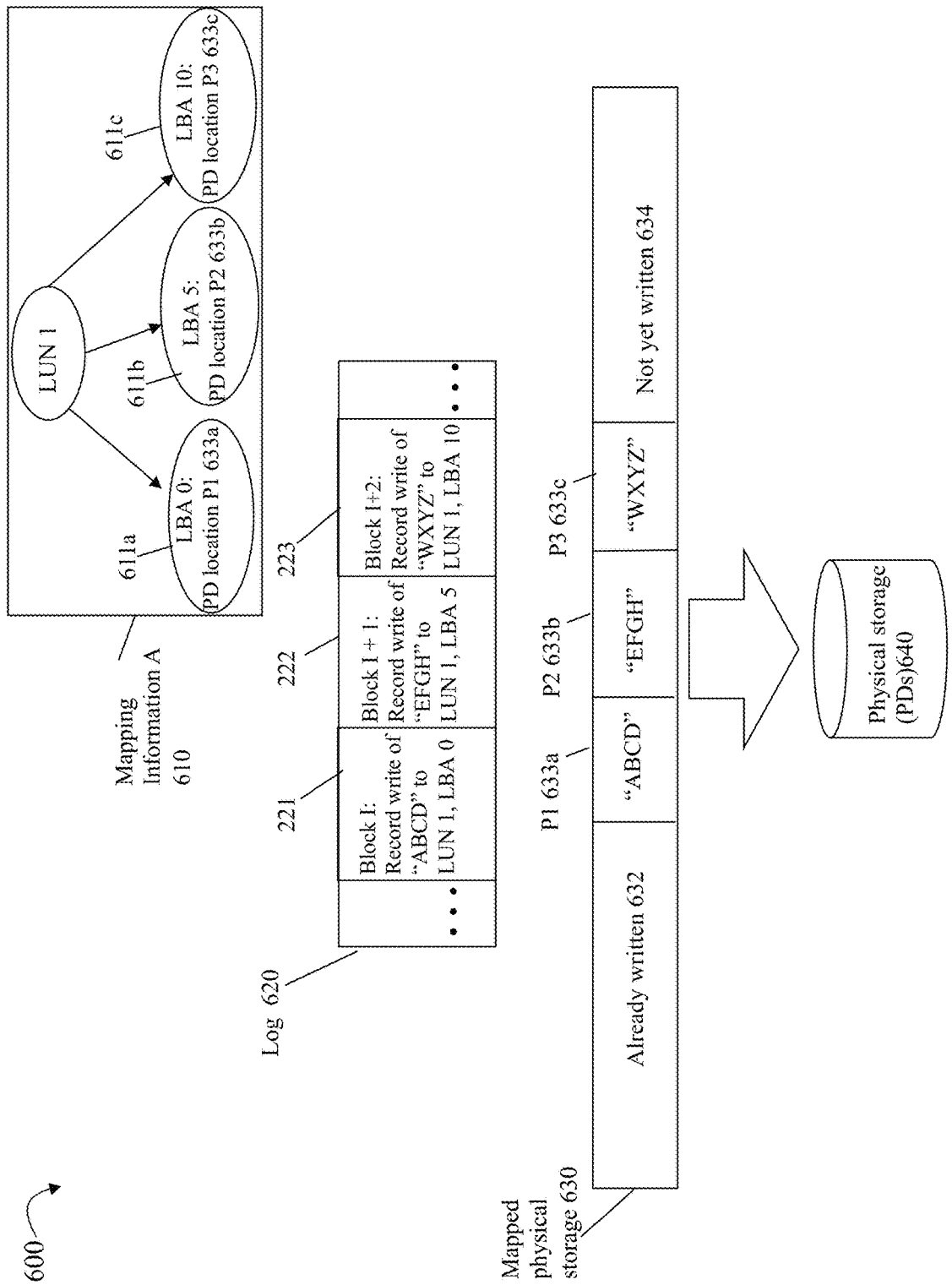

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
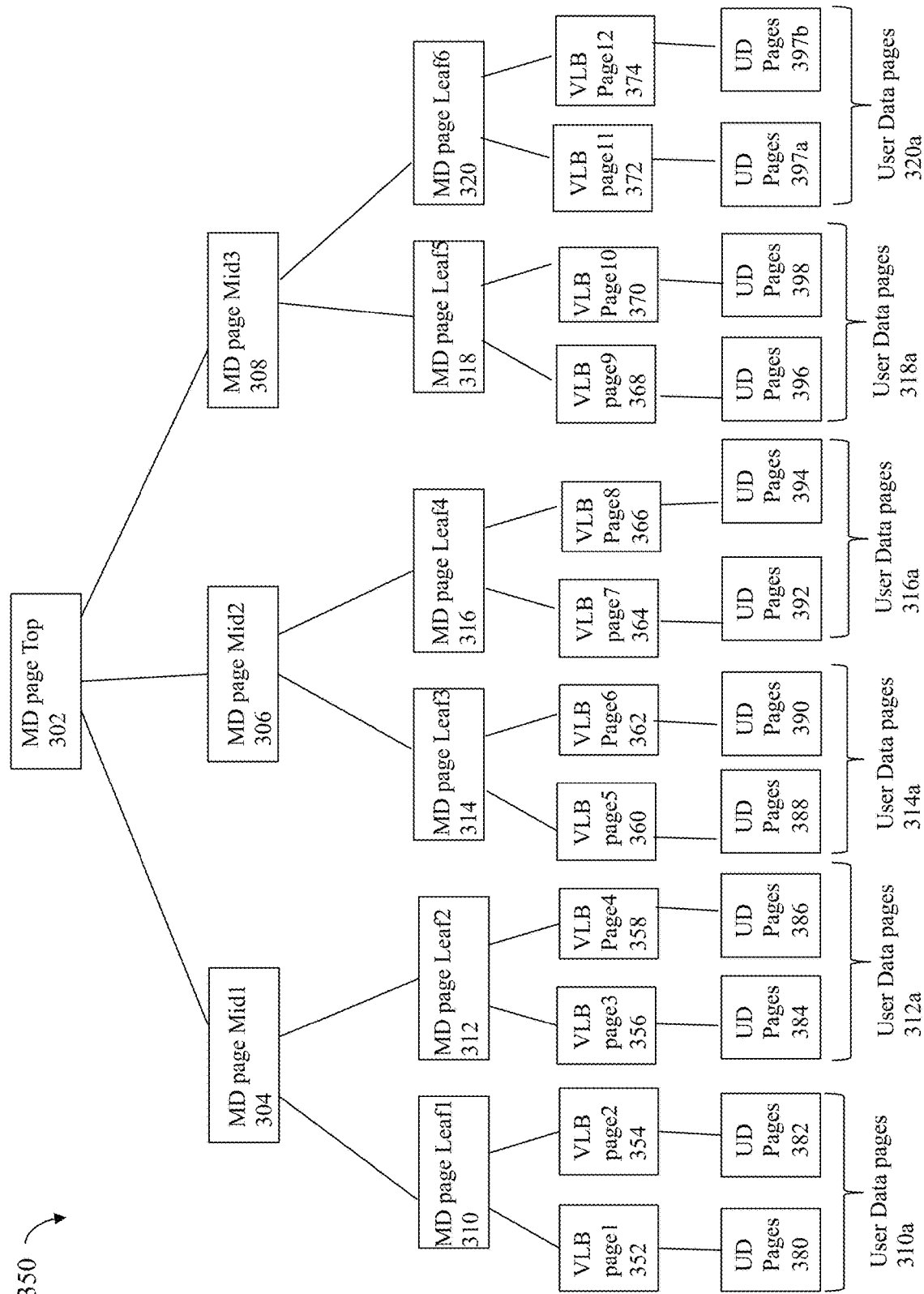

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages— MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
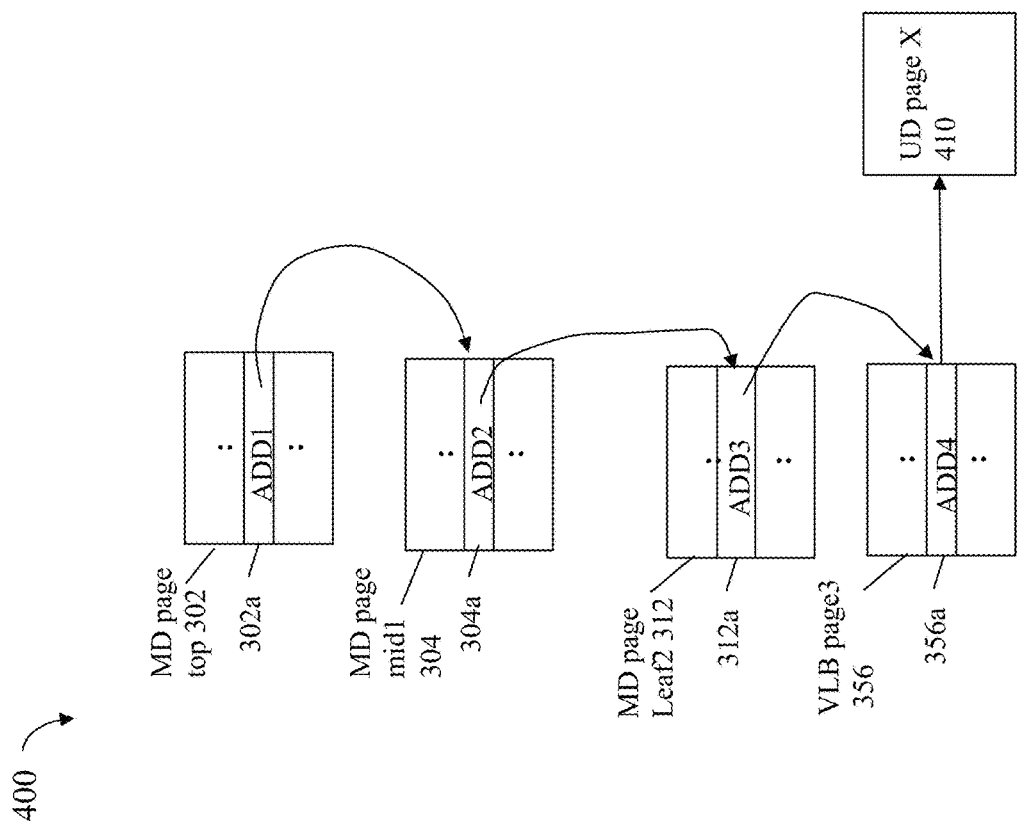

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
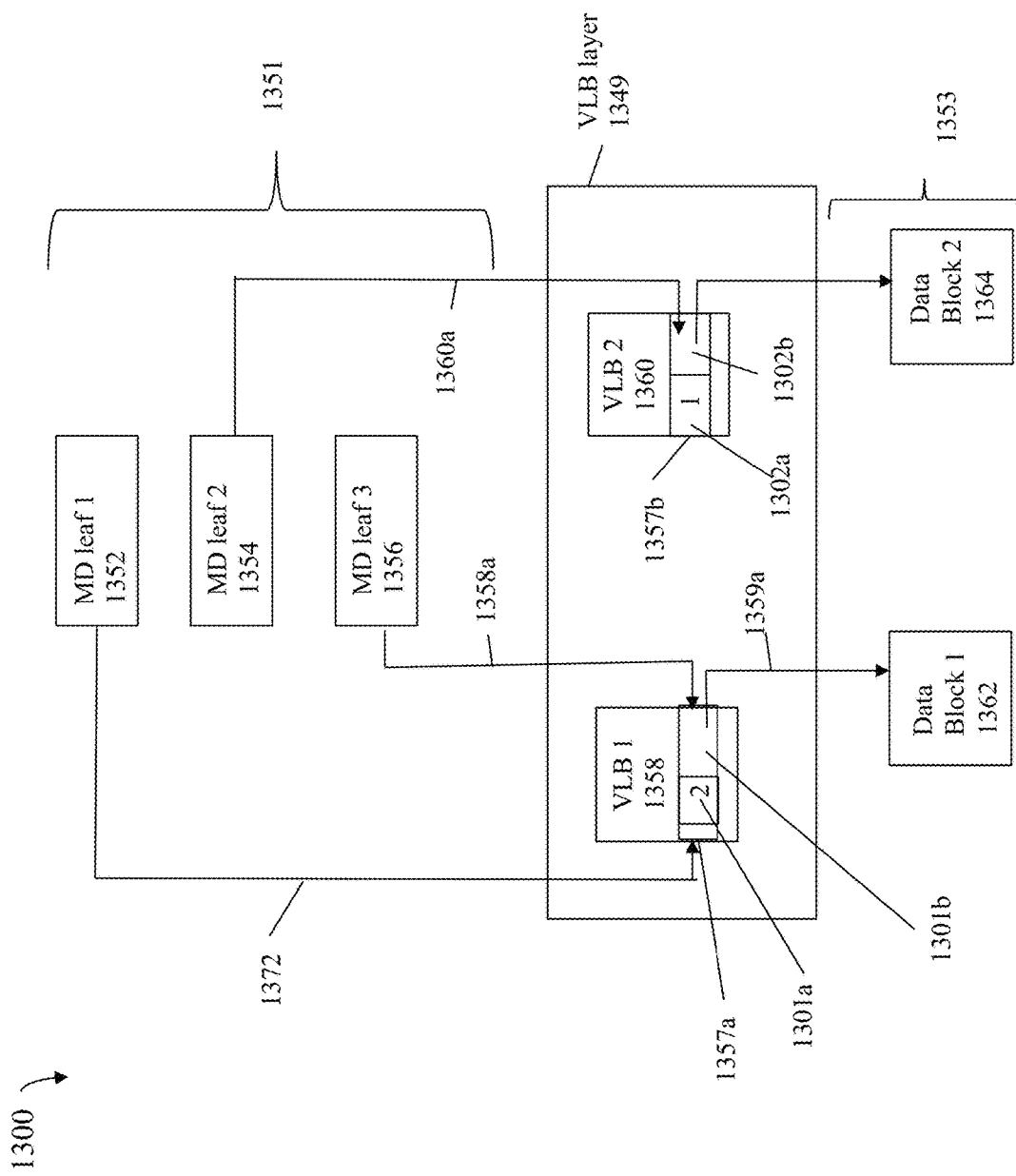

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6). In at least one embodiment, the LI can denote or can be the logical address, offset or location of the MD page. In at least one embodiment, the logical address, offset or location of the MD page can also be or denote the physical address, location or offset of the MD page as stored persistently on non-volatile storage, such as of the BE PDs of the data storage system.

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
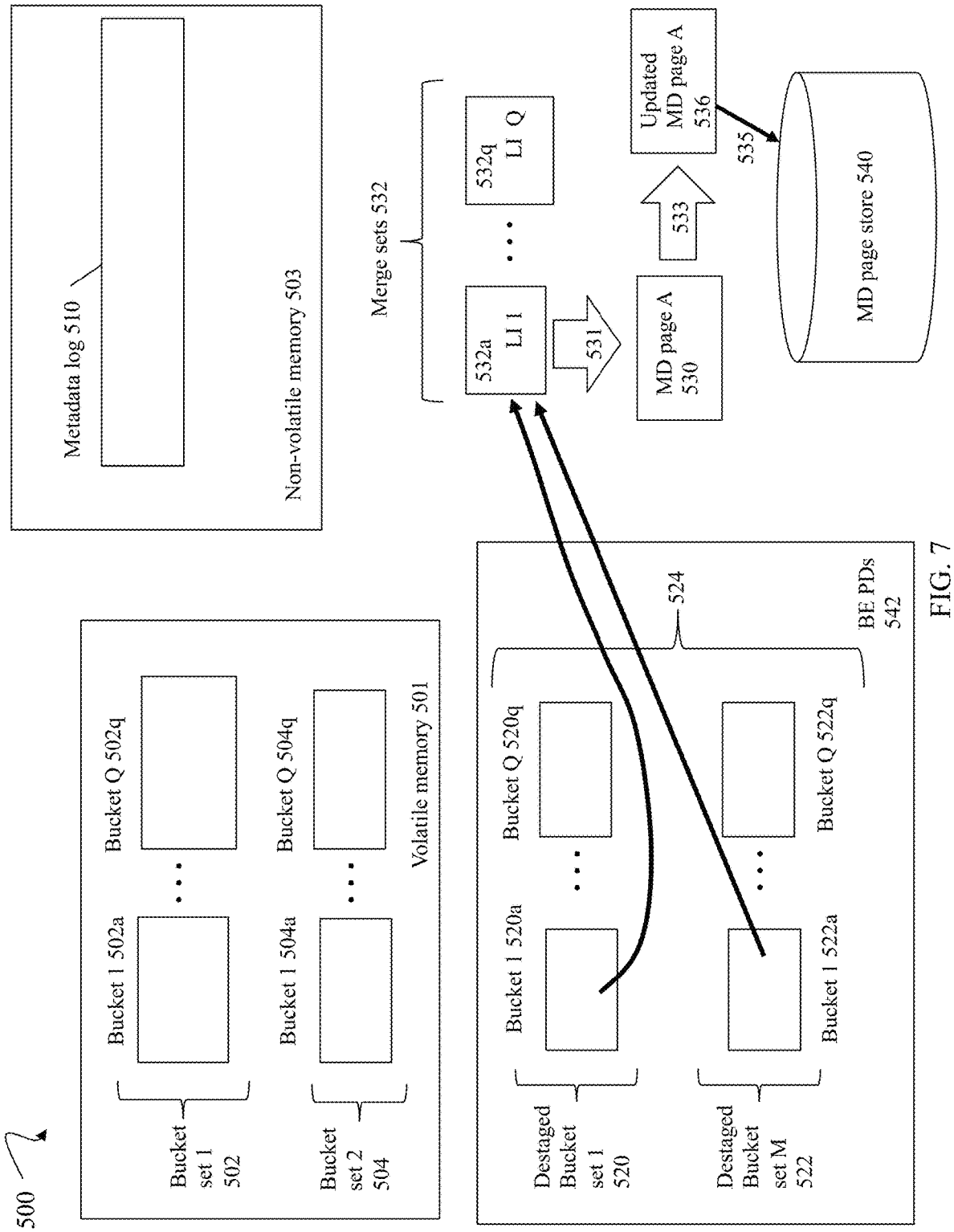
FIG. 7 is an example illustrating structures and associated data flow in at least one embodiment in accordance with the techniques of the present disclosure.

Referring to FIG. 7, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page.

Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

It should be noted that destaging the in-memory metadata log can generally be performed in a single phase or other suitable manner. For example, destaging the metadata log can be performed by processing and merging bucket sets without intermediate storage on the BE PDs. Rather, destaging the metadata log can include determining the merge sets using destaged bucket sets and merge sets stored in volatile memory.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, 6 and 7, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page, where each MD page in the sequence must be accessed serially and also in the strict sequential order of the sequence.

Consistent with other discussion herein, data storage systems have components whose responsibility is to map the user-visible logical address space to the internal physical address space, and implement various features such as, for example, snapshots, data compression, data deduplication, and the like. Such mapping and features may rely on different types of metadata to be implemented. This metadata can be typically stored persistently as, for example, 4K blocks of physical storage where different MD pages can reference each other by their physical block-addresses. In at least one system, each MD page when allocated can be assigned a unique logical address, location or offset that can actually be the physical storage address, offset or location on non-volatile storage where the MD page is persisted. In this model, there is generally no flexibility to move a MD page from an existing physical location to a new physical location since all MD pages referencing the to-be-moved MD page would have to be found and their references would need to be updated to reference the new physical location. As a result, metadata can be typically implemented as an in-place over-write system. In such a system, MD pages can remain in the same physical locations where updates to the MD pages are performed in-place and overwrite the same existing physical location. Thus, the MD pages can be persistently stored at fixed physical addresses such as on non-volatile BE PDs of the storage system. The BE PDs used to store the metadata using overwrites or in-place updates can be configured as RAID-level storage of one or more RAID groups. For performance reasons, metadata may have to be stored in a mirrored RAID configuration, such as a RAID-1 configuration, which has a small write performance cost for such in-place updates in comparison to an alternative parity-based RAID configuration such as RAID-5 or RAID-6. However, although the mirrored RAID configuration for the metadata may have less write performance costs as compared to parity-based RAID configurations, the mirrored RAID configuration can generally result in excessive use of storage capacity in comparison to the RAID parity-based configurations. Additionally, because of MD pages referencing each other by physical addresses or physical storage locations, defragmentation and reclaiming of capacity allocated to metadata may become an intractable problem.

Furthermore, in systems where the BE PDs or storage tier used to store the metadata are SSDs (solid state drives) such as flash-based storage, continually updating by overwriting to the same SSDs can result in exceeding a maximum number of allowed daily writes (writes per day or WPD) thereby leading to SSD wear out. The SSDs such as flash-based storage can be optimized for use in log structured systems where writes to a logical storage object, such as a MD page, are written to a new physical location each time the MD page is updated.

Based on the foregoing, there exists motivation to implement the persistent metadata storage, such as on a storage tier of the BE PDs, as a log-structured system which does not perform in place metadata updates and does not update an existing MD page stored at a physical address or location by overwriting current content of the physical storage address or location of the MD page with the new or updated content. Rather, in a log-structured system, updates to the metadata can be performed by writing the updated version of a MD page to a new physical location each time the MD page is updated.

However, use of a log-structured metadata system where each updated version of a MD page is written to a new physical location creates new challenges. Since the MD pages can reference one another, it can be impractical and undesirable to have the MD pages reference each other by their physical storage locations since, for example, storing an updated version of a first MD page to a new physical location would require updating all other referencing MD pages to now refer to the new physical location. As a result, MD pages can reference each other using logical addresses which can then be mapped by an intervening layer or mechanism to corresponding physical addresses or physical locations. The intervening layer or mechanism can maintain a new type of mapping that, for MD pages, translates a logical address of a MD page to its current corresponding physical address or location. In this manner, a first MD page can reference a second MD page using a logical address of the second MD page. The new type of mapping can use a simple translation table, referred to herein as a plain or simple TT (to distinguish from other uses of TT in following paragraphs) to map the logical address of the second MD page to its corresponding current physical location. When the second MD page is updated so that the updated version is stored at a new physical location, the plain TT can be updated to reference the new physical location and the first MD page can continue to reference the second MD page using the logical address that is mapped, by the translation table, to the new physical location. The plain TT can translate a logical address, offset or location (LPA) of a MD page to its corresponding physical address, offset or location (PPA).

Figure 8:
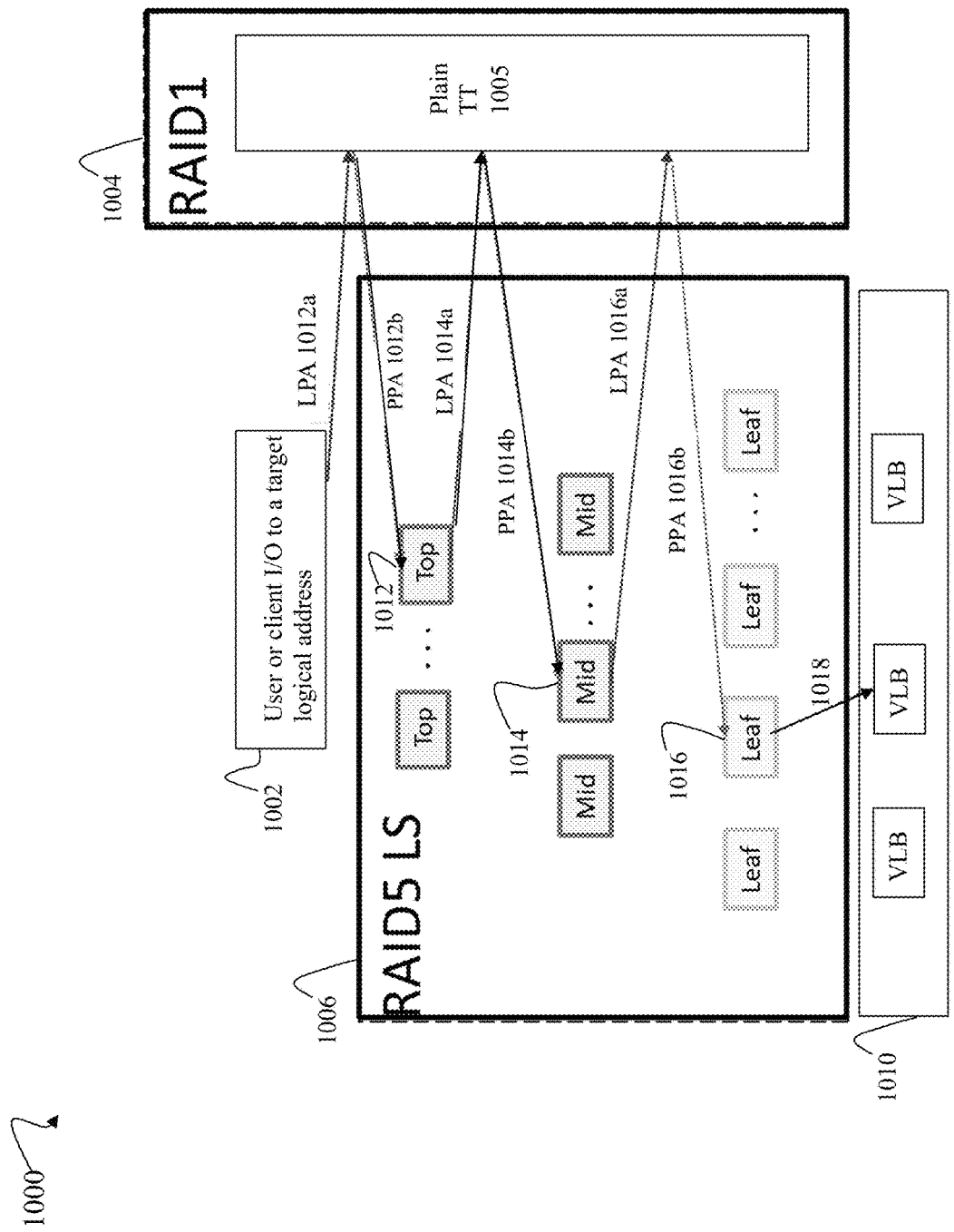
FIG. 8 is an example of illustrating logical to physical address translation of metadata pages included in a chain of mapping information

With reference to FIG. 8, one solution illustrated in the example 1000 can use the plain TT 1005 implemented as a sparse array of MD PPA pointers, indexed by LPAs. In other words, to map an LPA of a MD page to the corresponding PPA, processing can read the PPA from the plain TT 1005 array entry or element with the index LPA, which can be represented as PPAN=plain TT [LPAN]. In at least one solution, the plain TT structure 1005 can be implemented as an array and maintained as set of MD pages of a new MD page type, such as a new type "TT". The plain TT structure 1005 can be physically located on non-volatile storage 1004 configured using RAID-1 with in-place updates made to the plain TT structure 1005, for example, when the physical location or address (PPA) of a MD page changes as an updated version of the MD page is stored to physical storage.

In the example 1000, the element 1006 represents the non-volatile physical storage of the log structured system for persistently storing the MD pages. The storage 1006 can be configured using RAID-5 where a MD page can be written to a new physical storage location PPA on 1006 each time the MD page is updated. The element 1010 can represent the non-volatile storage used for persistently storing the VLB pages. Generally, the storage of 1004, 1006 and 1010 can be non-volatile storage, for example, of the BE PDs of the storage system.

The plain TT 1005 can be accessed through cache like other MD pages and can involve locking cached pages of the plain TT 1005. Consistent with discussion elsewhere herein, using the mapping information of MD pages to map a user data or client target logical address to its corresponding physical location storing the content of the target logical address can require that the mapping information of MD pages be in cache. The mapping information can be characterized as forming a chain of MD pages including a top MD page, a mid MD page, a leaf MD page and a VLB. A cached copy of a MD page of the chain can be accessed in the cache based on its corresponding LPA. If one of the MD pages of the mapping information is not stored in such as when servicing a read that reads the content from the target logical address, a cache miss results thereby triggering processing that loads the MD page from its current physical location on the non-volatile storage of 1006 into the cache for use in servicing the read. The plain TT 1005 can be used to map an LPA of a MD page to its corresponding PPA in connection with a cache miss of the MD page. The plain TT 1005 can be cached in order to be used in connection with the foregoing mapping of LPAs to corresponding PPAs for MD pages of the chain of mapping information. If the plain TT 1005, or entry thereof, it not in cache thereby resulting in a cache miss, additional overhead can be incurred in connection with also loading the plain TT 1005, or portion thereof causing the cache miss, into cache for use.

For example, consider a read I/O 1002 to read data from a target logical address. Assume a worst case scenario where none of the MD pages of the chain of mapping information for the read I/O 1002 are stored in the cache. For the target logical address, the LPA 1012*a* of the MD top page 1012 can be determined where the MD top page 1012 is not in cache. In response, cache miss processing can be performed where 1) the LPA 1012*a* is then mapped by the plain TT 1005 to its corresponding PPA 1012*b* identifying the physical address or storage location of the MD top page 1012 in 1006; and then 2) the MD top page 1012 is loaded from its PPA in 1006 into the cache and used to obtain the LPA 1014*a* of the next MD page, the mid MD page 1014, in the chain. Processing can determine that the mid MD page 1014 is not in cache. In response, cache miss processing can be performed where 1) the LPA 1014*a* is then mapped by the plain TT 1005 to its corresponding PPA 1014*b* identifying the physical address or storage location of the MD mid page 1014 in 1006; and then 2) the MD mid page 1014 is loaded from its PPA in 1006 into the cache and used to obtain the LPA 1016*a* of the next MD page, the leaf MD page 1016, in the chain. Processing can determine the leaf MD page 1016 is not in cache. In response, cache miss processing can be performed where 1) the LPA 1016*a* is then mapped by the plain TT 1005 to its corresponding PPA 1016*b* identifying the physical address or storage location of the MD leaf page 1016 in 1006; and then 2) the MD leaf page 1016 is loaded from its PPA 1016*b* in 1006 into the cache and used to obtain the pointer or address 1018 to the VLB in the chain.

In connection with the foregoing, if a MD page of the mapping information chain is in the cache, the associated cache miss processing and thus plain TT mapping can be omitted. However, in the worst case scenario, the mapping information chain can be doubled with the extra lookups for the plain TT mapping of the LPA to an associated PPA. When a MD page, such as a top, mid or leaf MD page, is updated, the updated version of the MD page can be written to a new physical location, new PPA, in the storage 1006. Additionally, when the MD page is updated and written to a new PPA, corresponding information in the plain TT 1005 is also updated. In particular, the entry of the plain TT 1005 for the MD page is updated to now reference the new PPA whereby the new PPA can be overwritten as in place update of the entry including the old PPA for the MD page. Additional costs can also be incurred in connection with locking associated with the pages of the plain TT. For example, when updating the plain TT 1005, an exclusive write lock can be obtained. When reading from an entry or page of the plain TT 1005 as stored in cache, a read lock can be obtained.

Additionally, accesses (e.g., updates as well as reads) to entries of the plain TT 1005 can be random so there is no locality of reference such as with respect to the user or client logical address space of a LUN. Consider, for example, two client or user write I/Os, where a first MD leaf page is allocated for a first of the write I/Os and a second MD leaf page is allocated for a second of the write I/Os. The two write I/Os can be received sequentially in time and can be directed to, for example, user data target logical addresses of the same LUN. The first and second MD leaf pages can be assigned random LIs and random LPAs. Storage in 1006 for the first and second MD leaf pages can be allocated at random locations, where the LIs of the MD pages can be logical addresses (LPAs) of the allocated MD leaf pages. As such, the foregoing LIs and LPAs can be random such that the particular entries in the plain TT 1005 associated with the two MD leaf pages (associated with sequential target logical addresses) can also be random with no locality of reference. Due to the size of the plain TT, it can be desirable to only cache portions of the plain TT corresponding to currently active LUNs of the user logical address space. However, as a result of the foregoing randomness, it is not possible to determine a portion of the plain TT 1005 (such as a contiguous range of entries of the plain TT) which corresponds to a currently active user or client data set (e.g., contiguous range of user logical address space of the LUN accessed) in order to maintain the portion of the plain TT in cache.

Thus, an implementation using the plain TT 1005 as illustrated in the FIG. 8 can have associated inefficiencies and undesirable additional overhead costs.

To address the above-noted problems and drawbacks, described herein are techniques that provide for efficient address translation for metadata in a log structured storage system using mixed or multiple mapping schemes. In at least one embodiment, the techniques of the present disclosure provide an efficient solution utilizing metadata of mapping information to map a user or client logical address to a corresponding storage location including content stored at the user or client logical address.

In at least one embodiment, a first portion of the metadata structure of mapping information can be stored in non-volatile physical storage having a non-parity RAID configuration, such as a RAID-1 configuration with one or more RAID-1 groups. A second different portion of the metadata structure of mapping information can be stored in non-volatile storage having a parity RAID configuration, such as a RAID-5 configuration with one or more RAID-5 groups. In at least one embodiment, the metadata structure of mapping information can be a hierarchical arrangement or structure of MD pages. The first portion of the metadata structure of mapping information, stored in the non-parity RAID configured storage, can include MD top and MD mid pages; and the second portion of the metadata structure of mapping information, stored in the parity RAID configured storage, can include MD leaf pages. In at least one such embodiment, the metadata structure of mapping information can generally be as described elsewhere herein, such as in connection with FIGS. 3, 4, 5 and 6 with differences discussed in more detail below.

In at least one embodiment, the MD leaf pages can be implemented as a log structured system in the parity RAID configured storage tier where each time a MD leaf page is updated, a new updated version of the MD leaf page can be written to a new physical storage location. In this manner in such an embodiment, a MD leaf page update is not performed in place by overwriting an existing storage location of the MD leaf page. In such an embodiment, the MD leaf pages can be characterized as moving to different physical storage locations within the parity RAID configured storage tier as updates are applied or written to such MD leaf pages as stored within the parity RAID configured storage tier. The parity RAID configured storage tier or parity RAID tier storing the MD leaf pages can sometimes referred to herein as the MD leaf storage tier.

In at least one embodiment, the MD top and mid pages can be implemented in the non-parity RAID configured storage tier where each time a MD top or mid page is updated, the update can be applied in place to overwrite the existing content stored at the existing storage location of the updated MD page. In such an embodiment, the MD top and mid pages can be characterized as being stored at fixed or static physical storage locations within the non-parity RAID configured storage tier or non-parity RAID tier, sometimes referred to herein as the MD top and mid storage tier. In at least one embodiment, the MD top and mid pages may not be moved or relocated to new physical storage locations in the non-parity RAID configured storage tier.

In at least one embodiment, processing can manage and maintain the non-parity RAID storage tier in accordance with an update in place policy where each top and mid MD pages can be stored at a fixed or static address in the non-parity RAID storage tier, and where each updated version of a top and mid MD page can rewritten to the same fixed or static address.

In at least one embodiment, processing can manage and maintain the parity RAID storage tier in accordance with a log structure system policy where each updated version of a MD leaf page can be rewritten to an updated physical storage location of the parity RAID storage tier, and where the updated physical storage location is different from an existing physical storage of the parity RAID storage tier where a prior version of the MD leaf page is stored prior to being updated.

In at least one embodiment, modifications or updates to the metadata structure of mapping information can be recorded in the metadata log as discussed elsewhere herein. In at least one embodiment, updates or modifications to MD top, mid and leaf pages can be recorded in corresponding entries the metadata log such as using tuples or deltas as also discussed elsewhere herein. Subsequently, the entries of the metadata log can be destaged and applied to the MD pages of the metadata structure of mapping information. In at least one embodiment, updates to a MD leaf page recorded as entries in the metadata log can be applied to the MD leaf page to determine an updated version of the MD leaf page, where the updated version of the MD leaf page can be written to a new physical storage location in the log structured system of the MD leaf storage tier. In at least one embodiment, updates to a MD top or mid page recorded as entries in the metadata log can be applied to the MD top or mid page using in-place updates or overwriting the existing storage location of the MD top or mid page with the new updated content.

In at least one embodiment, the LI of a MD page can denote or can be the logical address, offset or location (LPA) of the MD page. In at least one embodiment, the logical address, offset or location of the MD page (LPA) can also be or denote the physical address, location or offset of the MD page (PPA) as stored persistently on non-volatile storage, such as of the BE PDs of the data storage system.

The foregoing and other aspects of the techniques of the present disclosure are described in more detail in the following paragraphs.

In at least one embodiment, a user data (UD) or client logical address, which can be the target logical address of a client I/O operation such as a read or write operation, can be uniquely identified using the volume or LUN ID (identifier) in combination with the LBA or offset. In at least one embodiment, the combination of the volume or LUN ID and the LBA or offset can be mapped to, and represented using, a ULXA value, where the value of the ULXA can be generally characterized as an identifier uniquely identifying a particular user data (UD) page within a data storage system, and if multiple storage systems are included in a cluster, uniquely identified within the cluster of data storage systems. Thus, the ULXA can be a value that denotes or represents the logical address such as the UD logical address. From a given ULXA value, the uniquely associated LUN ID and LBA can be mapped or determined. Also, given a particular LUN ID and LBA (e.g., logical address), the unique corresponding ULXA value can be mapped or determined.

In at least one embodiment, a TT can be provided that translates the UD or client logical address to a physical address, location or offset (PPA) of a MD leaf page in the MD leaf storage tier. In at least one embodiment, the TT can translate or map a ULXA value to a PPA of a MD leaf page (e.g., MD leaf physical address or LFA) in the MD leaf storage tier. In at least one embodiment, the TT can be a ULXA or UD logical address-ordered hierarchical structure.

Figure 9:
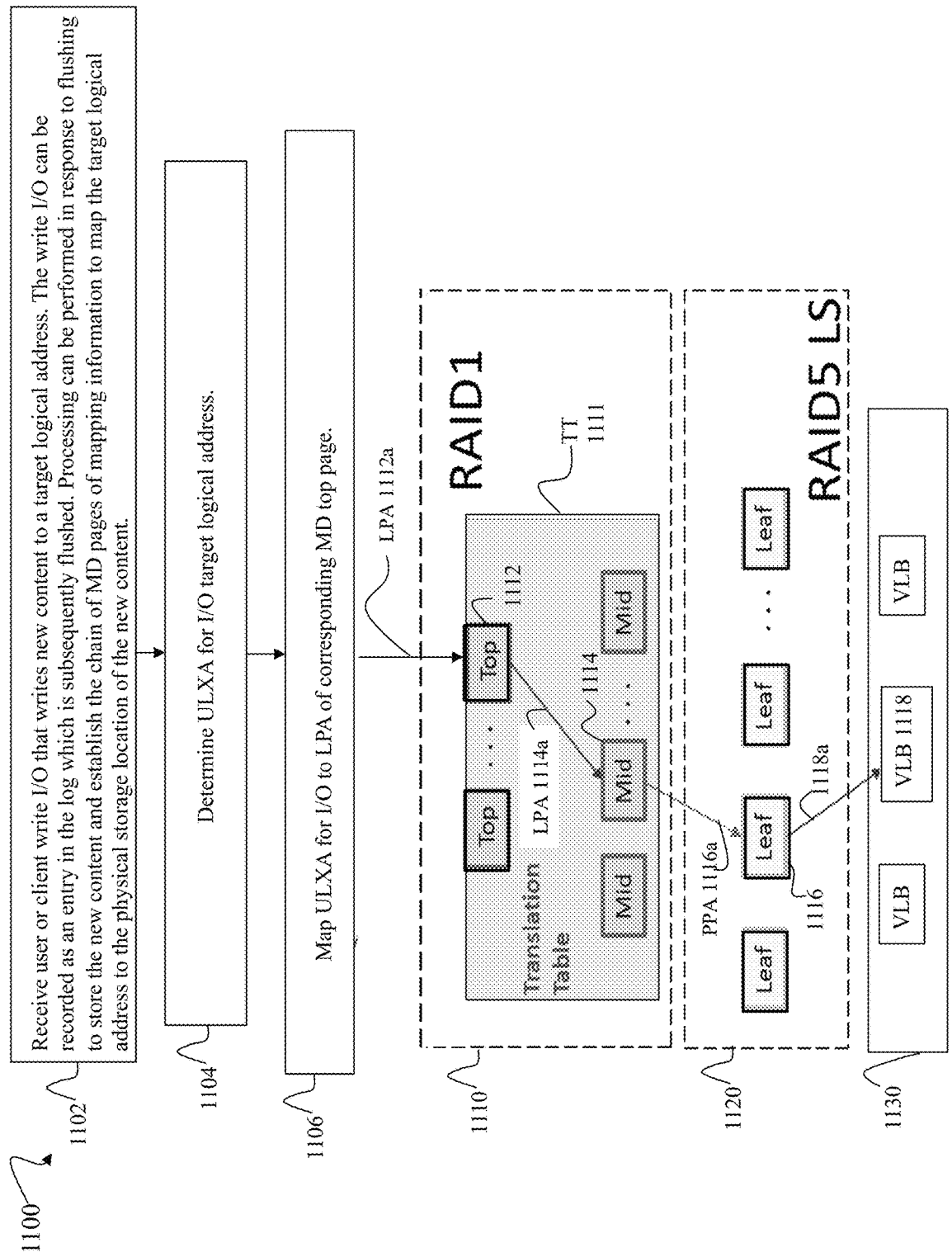
FIGS. 9, 10 and 11 are examples illustrating metadata pages included in a chain of mapping information in at least one embodiment in accordance with techniques of the present disclosure.

Referring to FIG. 9, shown is an example 1100 illustrating data flow and components in at least one embodiment in accordance with the techniques of the present disclosure. The example 1100 illustrates one embodiment using a combination of techniques in connection with storing and maintaining MD pages of mapping information which can be used to map a UD logical address to a corresponding physical storage location including content stored at the logical address. The example 1100 is described below with respect to particular I/O operations, such as a write I/O operation where a user or client writes new content to a target logical address.

The element 1110 can represent the non-parity RAID storage tier of non-volatile storage providing storage for the MD top and mid pages in at least one embodiment. In at least one embodiment, the non-parity tier 1110 can be a RAID-1 configured storage tier of one or more RAID-1 groups of PDs. Generally, the storage tier 1110 can be any suitable configuration providing for efficient updating in place. The non-parity tier can generally refer to a storage tier of one or more RAID groups configured in accordance with a RAID level that does not utilize parity information. As known in the art, different RAID levels, configurations and associated RAID algorithms can utilize parity information encoded on drives of a RAID group, for example, for performing RAID rebuild operations to recover corrupted or lost data of a RAID group member. Thus, a non-parity tier or configuration with respect to a RAID configuration can refer to a RAID level and associated configuration that does not utilize parity information. In contrast, a parity tier or configuration with respect to a RAID configuration can refer to a RAID level and associated configuration that does utilize parity information.

In at least one embodiment, the TT 1111 can denote the translation table used to translate or map a UD logical address (or its corresponding ULXA value) to a physical address, location or offset (e.g., PPA) of an entry in a MD leaf. The foregoing MD leaf can be included in the chain of mapping information of MD pages used to map the UD logical address to a physical storage location including content stored at the UD logical address. In at least one embodiment, the TT 1111 can be a ULXA-ordered or UD logical address ordered tree structure, or more generally, a hierarchical structure. In at least one embodiment, the TT can be implemented using the upper layers or levels of the metadata structure such as described, for example, in connection with FIGS. 3, 4, 5 and 6 with differences discussed below. In particular, the TT 1111 can include the MD top and mid pages of the aggregated metadata structure of mapping information with respect to the UD logical address space (e.g., including all LUNs and other storage objects storing user or client data). The particular MD top page and MD mid page of the TT 1111 used to map a particular UD logical address or ULXA value to a corresponding entry of a MD leaf entry denote that the foregoing three MD pages (e.g., MD top, mid and leaf pages) are included in the chain of MD pages of mapping information used to map the UD logical address to a physical storage location including content stored at the UD logical address.

In at least one embodiment, each entry of a MD top page of 1110 can reference another entry of a MD mid page of 1110 in accordance with the LPA or logical address or location of the MD mid page. In at least one embodiment, each entry of a MD mid page of 1110 can reference another entry of a MD leaf page in accordance with the PPA or physical address or location of the MD leaf page. Thus, the MD mid page entry of 1110 includes a pointer denoting the physical address or PPA of an entry of the MD leaf page stored in the tier 1120. Additionally, each entry of MD top page stored in 1110 can include a pointer denoting the logical address or LPA of an entry of a MD mid page stored in 1110.

In at least one embodiment, an update to a MD top or mid page of the tier 1110 can be an in place update. For a MD top or mid page of the tier 1110 having an existing version stored at an existing physical location in the tier 1110, an updated version of the MD top or mid page can be determined. Subsequently, the updated version can then overwrite the existing version whereby the updated version is written to the existing physical location in the tier 1110. In at least one embodiment, the MD top and mid pages of 1110 can be stored at corresponding static or fixed physical locations. In this manner, each MD top or mid page can be stored in the same physical location as originally allocated such that each time the MD page is updated, processing overwrites the same physical location in the tier 1110 with the new or updated version of the MD page.

The element 1120 can represent the parity RAID storage tier of non-volatile storage providing storage for the MD leaf pages in at least one embodiment. The MD leaf pages, and entries thereof, can be referenced by their respective PPAs, denoting their physical storage locations or addresses in the storage tier 1120. In at least one embodiment, the PPAs or physical addresses of MD leaf pages, and entries thereof, can denote the physical offset or location within the storage tier 1120. In particular consistent with discussion above, entries of MD mid pages stored in the tier 1110 can include pointers that denote physical addresses or PPAs of MD leaf page entries in the storage tier 1120. In at least one embodiment, the MD leaf pages stored in 1120 can be maintained in a log-structured manner such that an updated MD leaf page can be stored at a new physical location in the tier 1120. Thus, each time a MD leaf page is updated, the updated version can be stored at a new physical location in the tier 1120.

Each time the MD leaf page is updated and stored at a new physical location or new PPA in the tier 1120, the TT 1111 can be updated. In particular in at least one embodiment, a first entry of a MD mid page stored in 1110 can be updated to now reference a new PPA of a second entry of the updated MD leaf page stored in 1120. In some embodiments and scenarios, there can be multiple MD mid page entries which are updated to now reference the new PP of the second entry of the updated MD leaf page stored in the new physical location in 1120.

In at least one embodiment where 100% denotes the aggregated amount of physical non-volatile storage of all the MD top, mid and leaf pages associated with the UD logical address space, the MD top and mid pages can generally occupy about 1% of the storage and the MD leaf pages can generally occupy about 99% of the storage. In such an embodiment where the TT 1111 is implemented using the MD top and mid pages of the mapping information, an additional translation or mapping mechanism, such as plain TT described in connection with FIG. 8, is not needed.

The element 1130 can generally denote the non-volatile storage used to store VLB pages, and also possibly other items such as the stored user data or content.

At the step 1102, the data storage system can receive a user or client I/O, such as write I/O operation noted above which can write new content to a target logical address. The target logical address can be expressed as a LUN and LBA. Consistent with discussion elsewhere herein in at least one embodiment, the write I/O of 1102 can be recorded as an entry in the log or UD log which can be subsequently flushed. In response to flushing the entry, processing can be performed to store the new content and establish the chain of MD pages of mapping information to map the target logical address to the physical storage location of the new content. In some cases, data deduplication processing can be performed where the new content is determined to be a duplicate of an existing copy of user data currently stored at an existing storage location. Consistent with other discussion herein in such a case, the new content can be deduplicated so that the target logical address is associated with the existing storage location. Alternatively, if the new content is not a duplicate of existing content stored at an existing storage location, the new content can be stored persistently at a new storage location as new unique content.

From the step 1102, control proceeds to the step 1104 to commence processing in connection with establishing the chain of MD pages of mapping information for the write I/O operation. Generally, establishing the chain of MD pages of mapping information can include allocating one or more MD pages, and updating one or more MD pages, where such allocating and updating can be performed as may be needed and may vary with each write I/O operation.

For simplicity of illustration, the following paragraphs describe a scenario where the top, mid and leaf MD pages of the chain of mapping information for the write I/O can already exist. However, for the write I/O operation being processed, an entry of the MD leaf page is updated to reference or point to the storage location of the new content. More generally, if any MD page of the chain of mapping information does not yet exist, non-volatile storage can be allocated for the MD page, and the MD page can be updated as needed to point to or reference the next MD page in the chain.

In connection with the step 1104, processing can be performed to determine the ULXA value for the write I/O target logical address. From the step 1104, control proceeds to the step 1106 where the ULXA value for the target logical address of the write I/O can be mapped to the corresponding MD top page 1112 having the associated LPA (e.g., logical address or location) 1112a. Consistent with other discussion herein, each of the MD pages, such as the MD top, mid and leaf pages, can be associated with a particular UD logical address range of a particular LUN (e.g., logical device or volume) storing user or client data. As such, the corresponding MD top page 1112 can be determined to have an associated UD logical address range including the target logical address of the write I/O. If the MD top page 1112 having the LPA 1112a is not in cache, the MD top page 1112 can be loaded from its physical storage location within the storage tier 1110 into the cache. In a similar manner, each subsequently referenced MD page of the chain discussed below can be loaded into the cache as may be needed.

Reference is also now made to the example 1100 of FIG. 9, as well as the example 1200 of Figure which provides further details regarding the MD pages and entries thereof illustrating the chain of MD pages of mapping information used to map the target logical address to a storage location including the new content stored at the target logical address.

Figure 10:
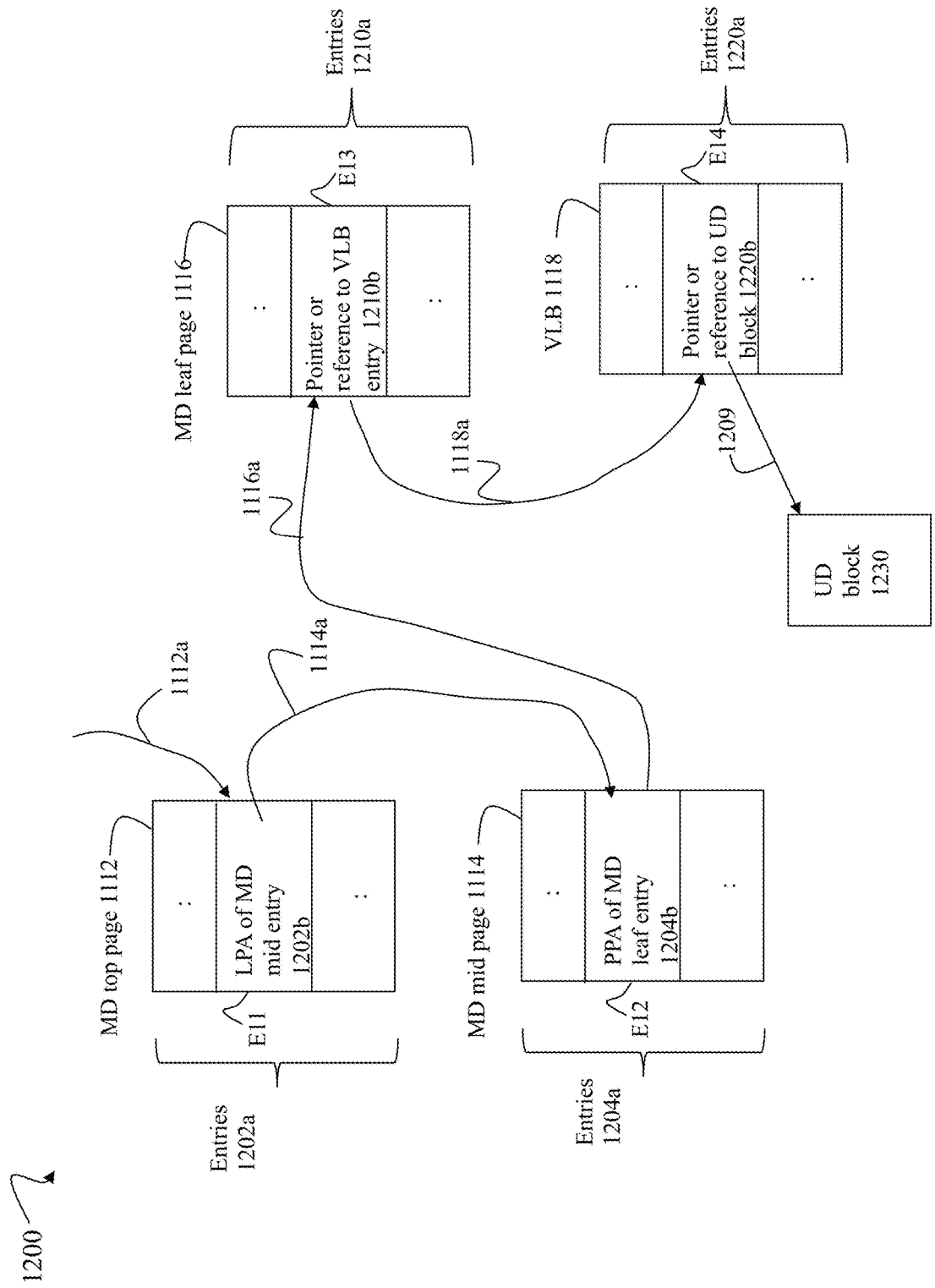

As illustrated in FIG. 10, the MD top page 1112 can include the entries 1202a comprising the entry E11, the MD mid page 1114 can include the entries 1204a comprising the entry E12, the MD leaf page 1116 can include the entries 1210a comprising the entry E13, and the VLB page 1118 can include the entries 1220a comprising the entry E14. The UD block 1230 can store the new content written by the write I/O of 1102.

In at least one embodiment, the LPA 1112a can denote an entry E11 in the MD top page 1112, where the entry E11 further includes a pointer denoting the logical address or LPA 1114a of an entry E12 in the MD mid page 1114. The entry E12 of the MD mid page 1114 can include a pointer denoting the physical address or location PPA 1116a of an entry E13 in the MD leaf page 1116. The entry E13 of the MD leaf page 1116 can include a pointer or reference 1118a to a VLB page entry E14 of the VLB page 1118. Although not illustrated in FIG. 9 for simplicity of illustration but illustrated in FIG. 10 in more detail, the VLB page entry E14 of the VLB 1118 can point to or reference (1209) the physical storage location 1230 of the content stored at the target logical address.

In connection with the write I/O of 1102 that writes to the target address, the foregoing chain of MD pages 1112, 1114, 1116 and 1118 can be established and traversed. As one scenario noted above, the write I/O of 1102 can be a subsequent write to the target logical address so that at least one prior write I/O has written to the same target logical address. In this scenario, the MD top 1112, mid 1114 and leaf 1116 pages can already exist so that the entry E13 of the MD leaf page 1116 noted above is updated to reference the VLB page entry E14 further referencing (1209) the new physical storage location 1230 of the new content written by the write I/O of 1102. In this case, an updated version of the MD leaf page 1116 can be determined where the updated version incorporates the update to the MD leaf page entry E13, and the updated version of the MD leaf page 1116 can be stored at a new physical storage location. Additionally, the entry E12 of the MD mid page 1114 is now also updated to reference the new physical storage location or PPA of the MD leaf entry E13 which has been relocated or moved to the new PPA. In this example, the update to the entry E12 of the MD mid page 1114 stored in the tier 1110 can be performed in-place so that the current physical storage location of the entry E12 of the MD mid page 1114 is updated or overwritten.

As another scenario, assume that the write I/O of 1102 is a first write in time to the target logical address. As such, any one or more of the MD pages 1112, 1114, 1116 may not yet exist. For each such non-existing MD top or mid page, storage can be allocated from the tier 1110. Similarly, storage can be allocated from the storage tier 1120 as may be needed for the MD leaf page 1116. Once any needed MD pages are allocated, the MD pages can be updated as also needed to establish the proper sequential chain of MD page references for the write I/O of 1102.

Generally, the chain of MD pages of mapping information for the write I/O of 1102 can be established at any suitable time. In at least one embodiment, the chain of MD pages of mapping information for the write I/O can be established subsequent to flushing entry for the write I/O from the log. In at least one embodiment, the mapping information for the write I/O can be established as part of flush processing. As a variation and optimization, an embodiment can establish the mapping information at a later point in time not as part of flush processing. For example, in at least one embodiment, rather than establishing the mapping information as part of flush processing (e.g., rather than perform such processing noted above to allocate the MD pages, traverse and update the chain of mapping information of MD pages, and the like, as part of the flushing the log entry for the client write I/O), a shortcut binding can alternatively be committed to the metadata log as part of flush processing. The shortcut binding can bind the logical address (of the client write I/O) to the corresponding VLB entry which includes a reference or pointer to the data block or BE PD location of the written content (by the client write I/O). In at least one embodiment, the shortcut binding can be committed by writing an entry to the metadata log, where the metadata log entry is a tuple representing the shortcut binding of the logical address (e.g., volume or LUN ID and LBA) to the VLB entry. The logical address, which is the target logical address of the write operation, can be uniquely identified using the volume or LUN ID (identifier) of the write operation in combination with the LBA or offset of the write operation.

In at least one embodiment, the shortcut binding of the logical address to a corresponding storage location including content stored at the logical address can be represented as a tuple in the metadata log. The tuple can be a new type of tuple referred to herein as a ULXA tuple, where the tuple has a new dedicated type T denoting the ULXA tuple type, and where the tuple has an LI=the unique ULXA value uniquely associated with the logical address of the UD page. The ULXA tuple can also identify or include in the tuple V field a reference to, or the address of, the VLB entry further used to access or reference the data block including the content stored at the logical address represented by the ULXA value (e.g., as included in the LI field of the tuple). Consistent with other discussion herein in at least one embodiment such as in connection with FIG. 6, the VLB entry can include a reference or pointer to the data block including the content stored at the logical address.

In at least one embodiment, actual implementation or construction and binding of the top-mid-leaf MD chains of mapping information for a write I/O can be delayed or postponed and done during destaging of the metadata log of metadata updates as discussed elsewhere herein. In particular, during flushing of the log of client updates, the ULXA tuples can be stored in the in-memory buckets of metadata updates of the metadata log and subsequently processed, for example, as described in connection with FIG. 7A. Destaging the metadata updates of the metadata log entries can be performed where processing can detect a tuple or metadata update with the type T=ULXA type. In response to detecting the tuple or update with the type T=ULXA, processing can be performed to create and/or update the chain of MD pages of the mapping information in an aggregated efficient manner using the information of the tuple. In at least one embodiment, each ULXA tuple can denote a metadata update to be made to a MD leaf page. In at least one embodiment, the metadata log destage processing flow is much more scalable and much less sensitive to latency, lock waiting, and the like.

In at least one embodiment, the ULXA value (stored as the LI of a ULXA tuple) can be used to index into the in-memory metadata log to determine the corresponding bucket into which the ULXA tuple is located. In such an embodiment, metadata updates to a particular MD page can be stored in the same bucket. The bucket and thus the MD page can have an associated logical address range with a corresponding ULXA range, where the bucket can include all metadata updates associated with any logical address of the logical address range and associated with any ULXA in the corresponding LBA range.

In at least one embodiment, since MD leaf pages of the storage tier 1120 can be moved or relocated each time there are updates to the MD leaf pages, garbage collection processing can be performed with respect to the storage tier 1120. Each MD leaf update resulting in rewriting the updated MD leaf page to a new physical storage location can create "holes" of storage storing old, unused or invalid content interspersed among portions of storage storing current valid content. Garbage collection can be performed in connection with storage management of the tier 1120 to reclaim and reuse free or invalidated physical storage as new updated MD leaf pages are written. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content. In this manner, performing garbage collection processing in connection with storage management of the tier 1120 as a log structured storage tier can result in physically relocating MD leaf pages of 1120 to new physical storage locations. If a MD leaf page such as 1116 is relocated within the storage tier 1120 as part of garbage collection, any corresponding one or more entries of MD mid pages (stored in the tier 1110) which reference the MD leaf page 1116, or an entry thereof, can also be updated to now reference the corresponding new updated physical storage location of the MD leaf page 1116, or entry thereof. In at least one embodiment, the one or more corresponding MD mid pages, and entries thereof, that should be updated can be determined by using a ULXA field of the relocated MD leaf page. In one such embodiment, the MD leaf page can include one or more fields denoting a contiguous range of UD logical addresses, and thus contiguous range of corresponding ULXA values, mapped to the relocated MD leaf page. To further illustrate, for an updated MD leaf L 1, processing can determine the logical address range A1 and associated ULXA range R1 associated with the MD leaf L1. In at least one embodiment, the MD leaf L1 can include one or more fields identifying the logical address range A1 of the MD leaf L1, thereby denoting that the MD leaf L1 is used in connection with accessing content stored at the logical addresses of the logical address range A1. In at least one embodiment, each entry of the MD leaf L1 can be associated with a corresponding one of the logical addresses of the logical address range A1 of the MD leaf L1. Each MD leaf entry associated with a logical address of the MD leaf LBA range can, for example, include a pointer or reference to a VLB entry further used to access a data block including content stored at the associated logical address. For example, the MD leaf L1 can include information indicating that the MD leaf L1 includes entries for LUN A, LBAs 0-15, inclusively. For the logical address range A1 of LUN A, LBA0-15, a corresponding ULXA range R1 can also be determined. Each logical address in A1 can have a corresponding ULXA value in the ULXA range R1. For each ULXA U1 in R1, and thus each logical address L1 in A1, having a corresponding entry Z1 in the relocated MD leaf, a corresponding entry Z2 in a MD mid page Z3 needs to be updated. The MD mid page Z3 and its entry Z2 to updated can be determined using and traversing the chain of MD pages (e.g., ULXA-MD top-MD mid) of mapping information for the ULXA U1 and thus each logical address L1. The foregoing traversal can be performed for each U1 in R1 to locate the MD mid page and can include, for example, determining a first entry of a MD top page for the ULXA U1, where the first entry references the corresponding entry Z2 of the MD mid page Z3, and wherein the entry Z2 is updated to reference the new physical location of a corresponding entry in the relocated MD leaf L1.

In some embodiments supporting snapshots, multiple MD mid pages can reference or point to the same MD leaf as a result of snapshots created. Similar to that as noted updated, when the MD leaf is updated and then stored in a new physical location, all such multiple MD mid pages must now be updated to reference the new physical location of the updated MD leaf, or entry thereof. In this case, traversing the regular chain of mapping information of MD pages may not result in locating all the MD mid pages requiring updating.

Figure 11:
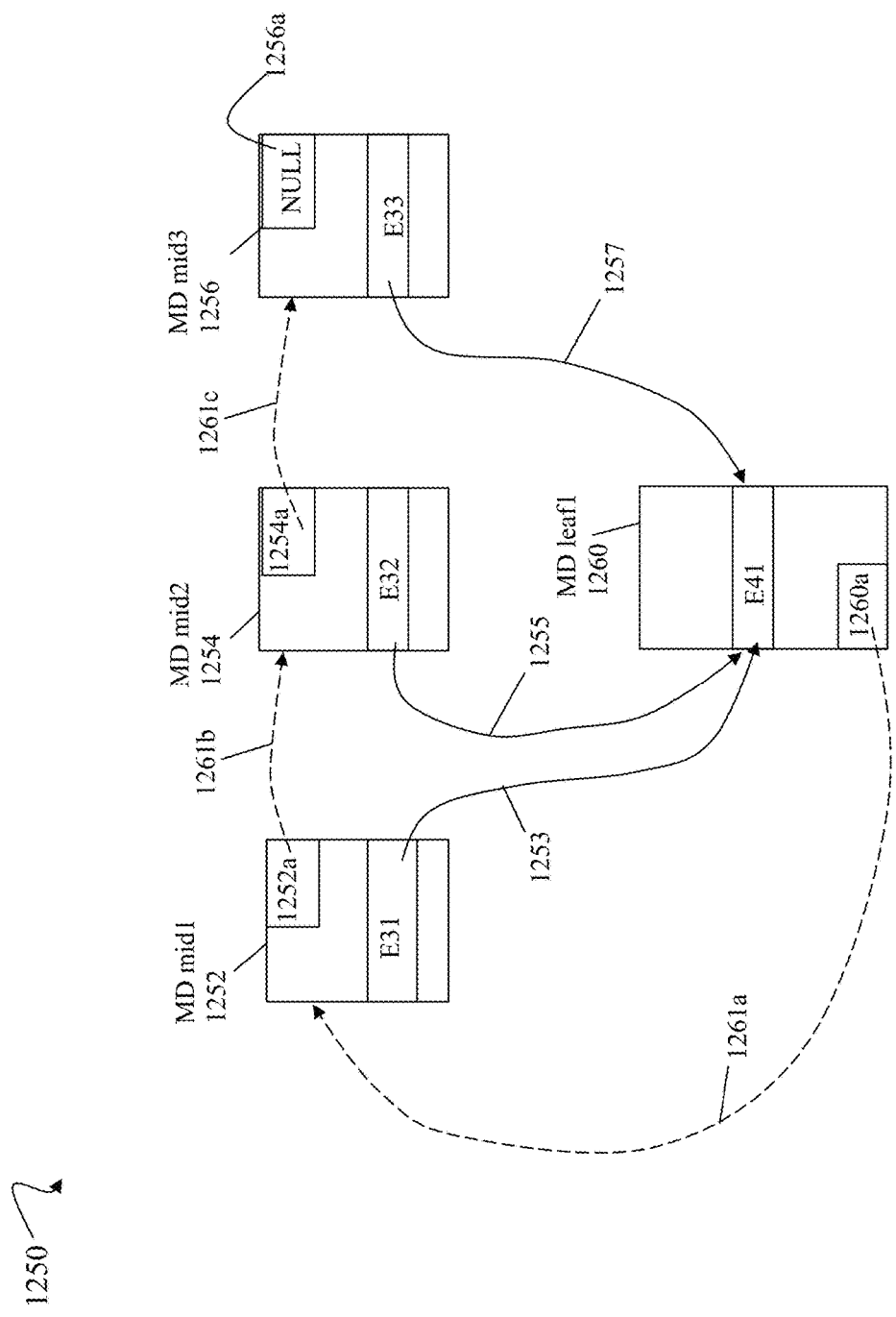

To further illustrate, reference is made to the example 1250 of FIG. 11. The example 1250 includes the MD mid pages 1252, 1254 and 1256, where each of the 3 MD mid pages can be associated with a different snapshot created of a LUN. The 3 snapshots can be created sequentially where there have been no updates to the snapshots so that they all reference the same MD leaf 1260. For example, snapshot 1 (snap1) can be associated with the MD mid page 1252, snapshot2 (snap2) can be associated with the MD mid page 1254, and snapshot 3 (snap3) can be associated with the MD mid page 1256. It should be noted that the example 1250 only includes a portion of the MD pages associated with such snapshots for illustration.

In FIG. 11, the entries E31, E32 and E33, respectively, of the MD mid pages 1252, 1254 and 1256 can reference the entry E41 of the MD leaf page 1260. In particular, the entries E31, E32 and E33 can include a pointer to, or the physical address (e.g., PPA) of, the entry E41 in the storage tier 1120. In this example, the MD leaf 1260 can be updated and stored at a new physical storage location in the parity RAID storage tier 1120. Thus, the physical storage location or PPA of the MD leaf 1260 and its entry E41 have changed so that the references made by E31, E32 and E33 to the entry E41 need to be accordingly updated to reference the new PPA of E41.

As a first option or solution in at least one embodiment, an inheritance chain or linked list of the MD mid pages of the snapshots can be traversed to locate all MD mid pages, and entries thereof, requiring updating. For example, in at least one embodiment, the MD leaf page 1260 can include a field 1260a that is a pointer or reference to the head of the inheritance chain or linked list of MD mid pages referencing the MD leaf page 1260. In the example 1250, the field 1260a references or points (1261a) to the MD mid page 1252 which includes the corresponding entry E31 that is updated to reference the new PPA of E41. The MD mid page 1252 includes the field 1252a that further points to or references (1261b) the next MD mid page 1254 in the chain. The entry E32 of the MD mid page 1254 can be updated to reference the new PPA of E41. The MD mid page 1254 includes the field 1254a that points to or references (1261c) the next MD mid page 1256 in the chain. The entry E33 of the MD mid page 1256 can be updated to reference the new PPA of E41. The MD mid page 1256 includes the field 1256a that can be used to identify the next MD mid page in the inheritance chain. However, in this example, the MD mid page 1256 is the last element in the linked list or inheritance chain whereby the entry 1256a is null. In at least one embodiment, the foregoing 3 updates to the MD mid page entries E31, E32 and E33 do not have to be done in a single transaction.

As a second option or solution which is a variation of the foregoing in at least one embodiment, rather than update the MD leaf 1260 and store the updated version of the MD leaf 1260 at a new physical storage location in the storage tier 1120, the MD leaf 1260 can be updated in place by overwriting the current physical storage location of the MD leaf 1260 with an updated version of the MD leaf 1260. In this second solution, there are no updates made or needed to the entries E31, E32 and E33 because the physical storage location of the entry E41 has not changed since any required update to the MD leaf 1260 has been applied in place by overwriting the current physical storage location of the MD leaf 1260 in the tier 1120. It should be noted that in this second latter option or solution, the storage tier 1120 can be generally managed and maintained as a log structured store or tier as described above in connection with other types of updates to MD leaf pages of the tier 1120. However, for one or more special cases as in connection with the scenario illustrated in FIG. 11, in place updating or overwriting of the same physical storage location of the MD leaf page can be allowed as an exception.

In at least one embodiment implementing the second option or solution just described in connection with FIG. 11, the selective in place update of the MD leaf page can be performed so as not to invalidate the MD MID pages referencing the MD leaf page. In one such embodiment, processing can conditionally and selectively choose to perform either the first option or the second option in accordance with one or more criteria. For example, in at least one embodiment, processing can be performed to conditionally implement the second option if the MD leaf page is referenced by more than a specified maximum number of MD mid pages. Otherwise, processing can be performed to implement the first option.

It should be noted that the chain of MD pages of mapping information as described in connection with FIGS. 9 and 10 above is with respect to a write I/O operation where one or more of the MD pages of the mapping information can be allocated and/or updated. Consistent with discussion herein, an existing chain of MD pages of mapping information can be accessed for reading in connection with a read I/O operation directed to a target logical address.

As noted above, FIG. 10 provides additional detail regarding the MD pages used in mapping the target logical address to a physical storage location storing content of the target logical address. The structures, such as MD pages, of FIG. 10 can be similar to other MD pages described, for example, in connection with FIGS. 3, 4, 5 and 6 with differences discussed above.

In comparison, for example, to the use of the plain TT of FIG. 8, the techniques of the present disclosure described above can provide shorter runtime mapping chains with less contention and dependencies when using mapping information such as for client or user read and write I/O operations. The techniques of the present disclosure such as illustrated in connection with FIG. 9 can utilize top and mid MD pages to perform the function of the TT. The techniques of the present disclosure can provide for efficient caching such as by utilizing TT locality with respect to an active data set which can correspond to a dynamically changing small portion of the overall UD logical address space. For example, the TT comprising the top and mid MD pages can be organized by ULXAs or user logical addresses. In at least one embodiment, rather than cache the entire TT, processing can cache just a portion of the TT where the portion corresponds to the currently active data set. In at least one embodiment, the currently active data set can include, for example, a group of LUNs or more generally storage objects, or portions thereof, which have an associated activity or access level above a specified threshold. The activity or access level for an individual storage object, such as each individual LUN or portion thereof, can be determined using one or more workload metrics with respect to I/Os directed to logical addresses of the LUN. The one or more metrics can include, for example, one or more of: IOPS (I/Os per second or an I/O rate), write I/O rate, read I/O rate, amount of data read per unit of time, amount of data written per unit of time, overall data transfer rate, and the like. Based on the foregoing where the measured workload of a LUN, or portion of the logical address space thereof, exceeds a specified threshold, the LUN or portion of its logical address space can be determined as active and included in the active data set. In response, top and mid MD pages of the TT mapped to the active LUN's logical address space can be selectively loaded and/or selective retained in cache for as long as its associated workload meets the specified threshold, or more generally meets one or more criteria, qualifying the workload as part of the currently active data set. As different LUNs, and portions thereof, can have different associated activity levels over time, the currently active data set with respect to the entire user logical address space can change over time.

Referring to FIGS. 12, 13, 14A, 14B and 15, shown are flowcharts of processing steps that can be performed in at least one embodiment of the techniques of the present disclosure.

Figure 12:
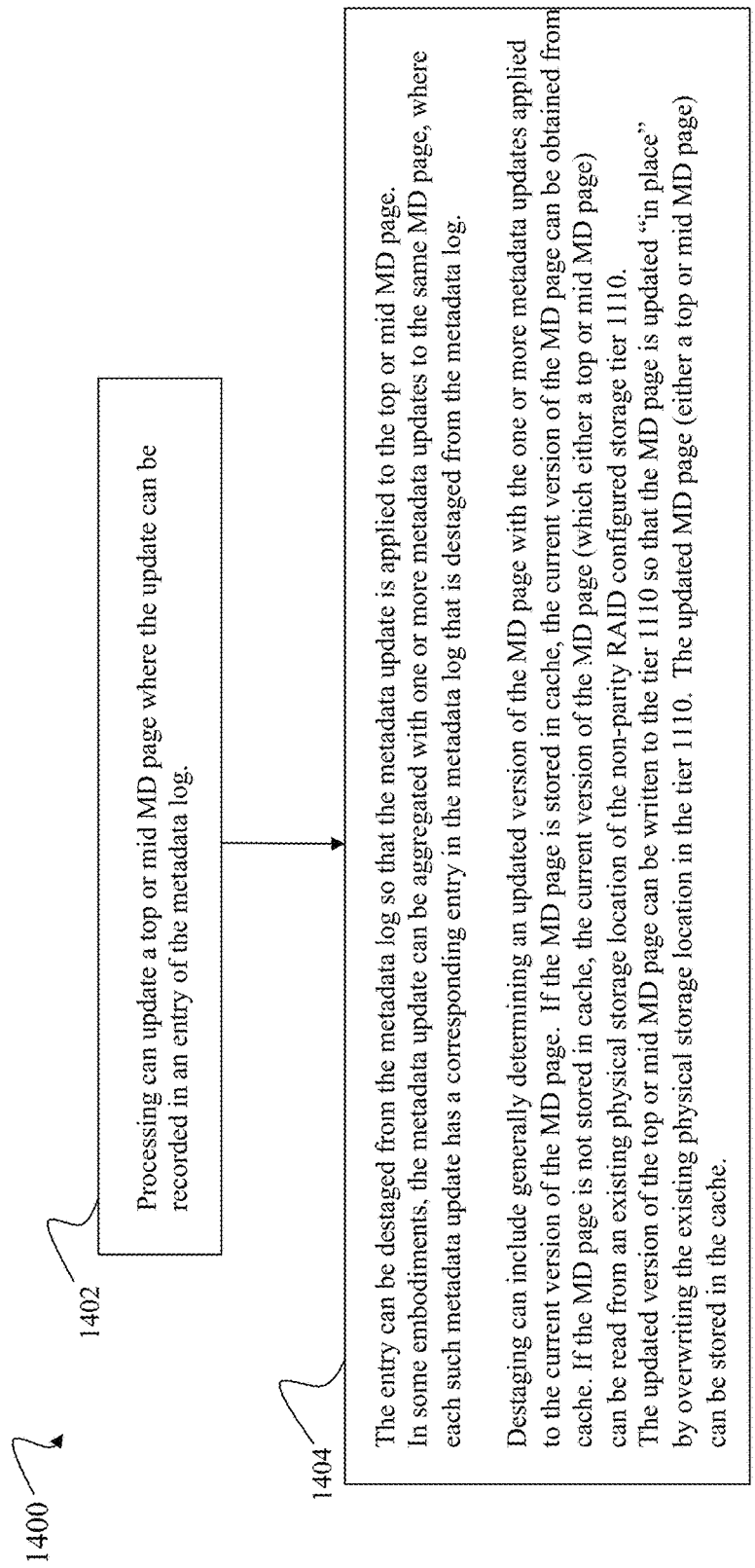

Referring to FIG. 12, shown is a flowchart 1400 of processing steps that can be performed to update a top or mid MD page in at least one embodiment in accordance with the techniques of the present disclosure.

At the step 1402, processing can update a top or mid MD page where the update can be recorded in an entry of the metadata log. From the step 1402, control proceeds to the step 1404.

At the step 1404, processing can be performed to destage the entry (as recorded in the step 1402) from the metadata log. The entry can be destaged from the metadata log so that the metadata update is applied to the top or mid MD page. In some embodiments, the metadata update can be aggregated with one or more metadata updates to the same MD page, where each such metadata update has a corresponding entry in the metadata log that is destaged from the metadata log. Destaging can include generally determining an updated version of the MD page with the one or more metadata updates applied to the current version of the MD page. If the MD page is stored in cache, the current version of the MD page can be obtained from cache. If the MD page is not stored in cache, the current version of the MD page (which either a top or mid MD page) can be read from an existing physical storage location of the non-parity RAID configured storage tier 1110. The updated version of the top or mid MD page can be written to the tier 1110 so that the MD page is updated "in place" by overwriting the existing physical storage location in the tier 1110. The updated MD page (either a top or mid MD page) can be stored in the cache.

Figure 13:
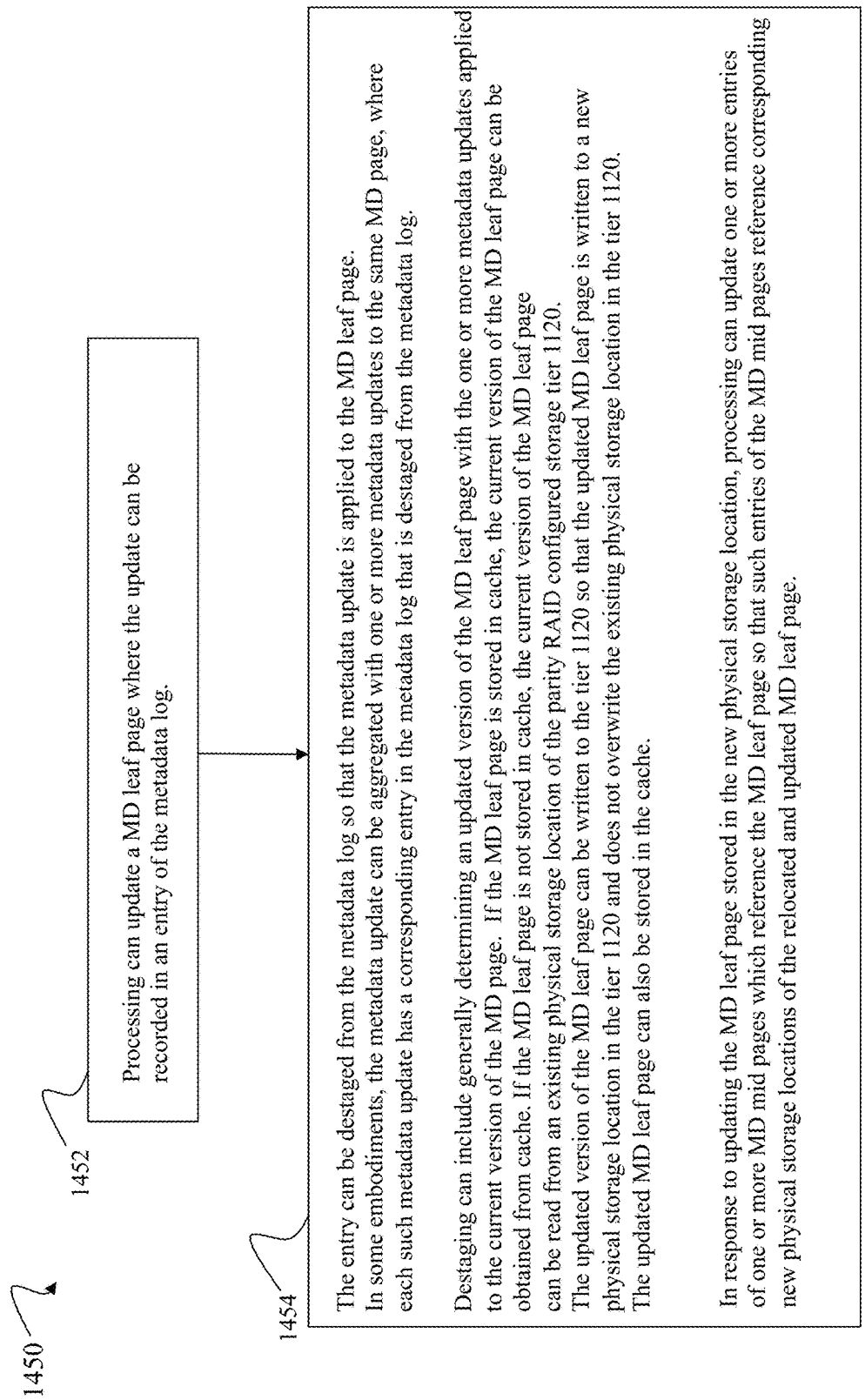

Referring to FIG. 13, shown is a flowchart 1450 of processing steps that can be performed to update a MD leaf page in at least one embodiment in accordance with the techniques of the present disclosure.

At the step 1452, processing can update a MD leaf page where the update can be recorded in an entry of the metadata log. From the step 1452, control proceeds to the step 1454.

At the step 1454, processing can be performed to destage the entry (as recorded in the step 1452) from the metadata log. The entry can be destaged from the metadata log so that the metadata update is applied to the MD leaf page. In some embodiments, the metadata update can be aggregated with one or more metadata updates to the same MD page, where each such metadata update has a corresponding entry in the metadata log that is destaged from the metadata log. Destaging can include generally determining an updated version of the MD leaf page with the one or more metadata updates applied to the current version of the MD page. If the MD leaf page is stored in cache, the current version of the MD leaf page can be obtained from cache. If the MD leaf page is not stored in cache, the current version of the MD leaf page can be read from an existing physical storage location of the parity RAID configured storage tier 1120. The updated version of the MD leaf page can be written to the tier 1120 so that the updated MD leaf page is written to a new physical storage location in the tier 1120 and does not overwrite the existing physical storage location in the tier 1120. The updated MD leaf page can also be stored in the cache.

Additionally in the step 454 in response to updating the MD leaf page stored in the new physical storage location, processing can update one or more entries of one or more MD mid pages which reference the MD leaf page, or entry thereof, so that such entries of the MD mid pages reference corresponding new physical storage locations of the relocated and updated MD leaf page.

Figure 14A:
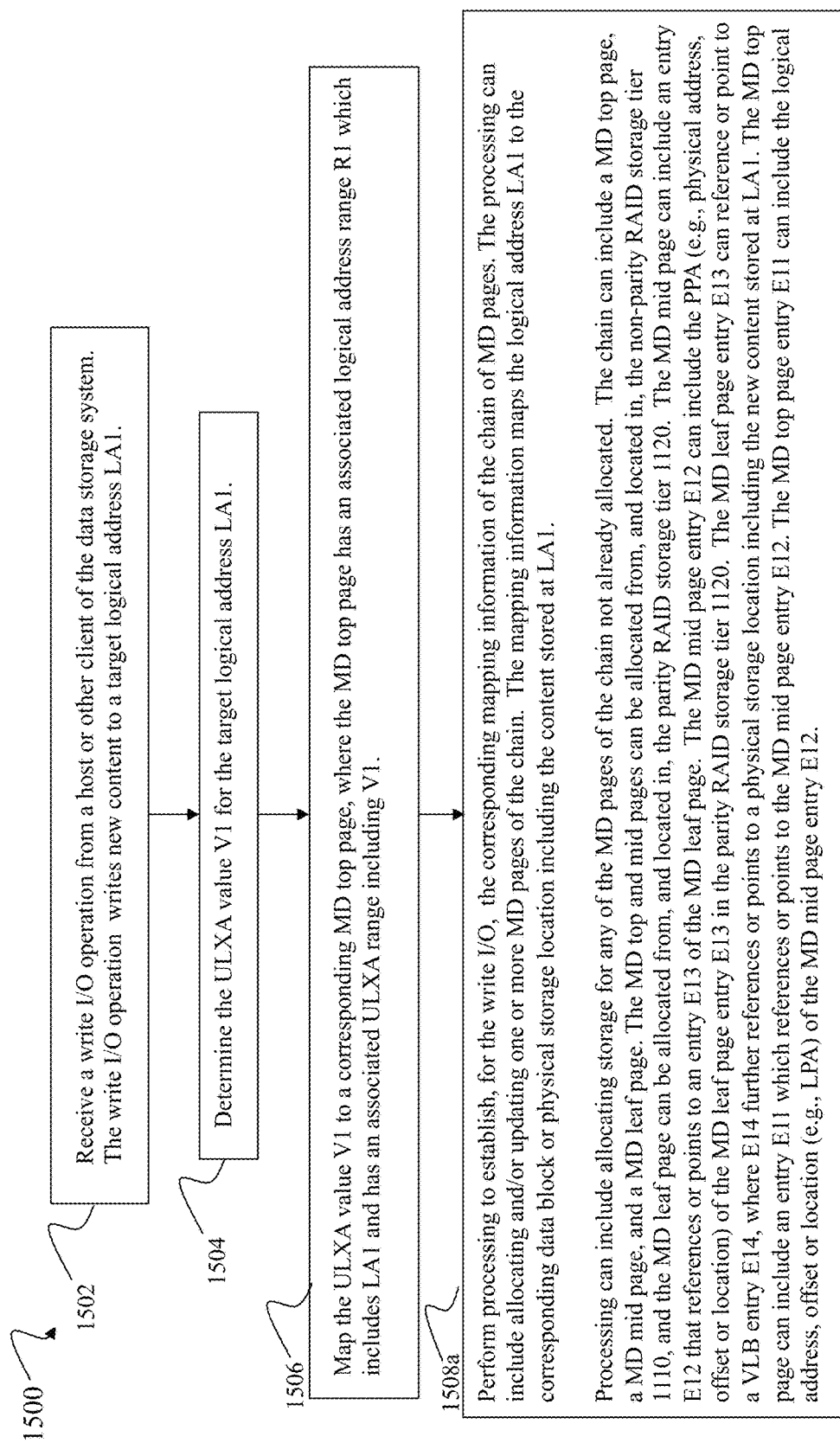

Referring to FIGS. 14A and 14B, shown is a flowchart 1500, 1550 of processing steps that can be performed in connection with a write I/O operation in at least one embodiment in accordance with the techniques of the present disclosure.

At the step 1502, a write I/O operation can be received at the data storage system from a host or other client of the data storage system. The write I/O operation writes new content to a target logical address LA1. LA1 can be expressed as, for example, a LUN and LBA. In some embodiments, an entry for the write I/O can be persistently recorded in the log (e.g., UD log) and a response or acknowledgement can then be returned to the host or other client. The subsequent steps of FIGS. 14A and 14B can be generally performed when the entry (of the step 1502) is flushed from the log. Depending on the particular embodiment and implementation, the subsequent steps can be generally performed as part of flush processing of the entry and/or subsequent to flush processing of the entry.

From the step 1502, control proceeds to the step 1504. At the step 1504, the ULXA value V1 can be determined for the target logical address LA1. From the step 1504, control proceeds to the step 1506 where the ULXA value V1 can be mapped to a corresponding MD top page and entry thereof, where the MD top page has an associated logical address range R1 which includes LA1 and has an associated ULXA range including V1. From the step 1506, control proceeds to the step 1508.

Generally, the step 1508 can include the processing of the steps 1508a-c. The step 1508a can include performing processing to establish, for the write I/O, the corresponding mapping information of the chain of MD pages. The processing can include allocating and/or updating one or more MD pages of the chain. The mapping information maps the logical address LA1 to the corresponding data block or physical storage location including the content stored at LA1. Processing of the step 1508a can include allocating storage for any of the MD pages of the chain not already allocated. The chain can include a MD top page, a MD mid page, and a MD leaf page. The MD top and mid pages can be allocated from, and located in, the non-parity RAID storage tier 1110, and the MD leaf page can be allocated from, and located in, the parity RAID storage tier 1120. The MD mid page can include an entry E12 that references or points to an entry E13 of the MD leaf page. The MD mid page entry E12 can include the PPA (e.g., physical address, offset or location) of the MD leaf page entry E13 in the parity RAID storage tier 1120. The MD leaf page entry E13 can reference or point to a VLB entry E14, where E14 further references or points to a physical storage location including the new content stored at LA1. The MD top page can include an entry E11 which references or points to the MD mid page entry E12. The MD top page entry E11 can include the logical address, offset or location (e.g., LPA) of the MD mid page entry E12.

The step 1508 can also include the step 1508b where processing to establish the mapping information for the write I/O operation can include updating one or more MD pages of the chain such as to update an entry of one of the MD pages to reference the next MD page in the chain. Updating the MD top or mid page can include determining an updated version of the MD top or mid page with one or more metadata updates applied to the current version of the MD page. If the MD top or mid page is stored in cache, the current version of the MD page can be obtained from cache.

If the MD top or mid page is not stored in cache, the current version of the MD page (which either a top or mid MD page) can be read from an existing physical storage location of the non-parity RAID configured storage tier 1110. The updated version of the top or mid MD page can be written to the tier 1110 so that the MD page is updated "in place" by overwriting the existing physical storage location in the tier 1110. The updated MD page (either a top or mid MD page) can be stored in the cache.

Updating the MD leaf page can include determining an updated version of the MD leaf page with one or more metadata updates applied to the current version of the MD leaf page. If the MD leaf page is stored in cache, the current version of the MD leaf page can be obtained from cache. If the MD leaf page is not stored in cache, the current version of the MD leaf page can be read from an existing physical storage location of the parity RAID configured storage tier 1120. The updated version of the MD leaf page can be written to a new physical storage location that is different than the existing physical storage location. The updated version of the MD leaf page does not overwrite the existing physical storage location in the tier 1120. The updated MD leaf page can also be stored in the cache.

Deduplication can be performed to determine whether the new content C1 written by the write I/O is a duplicate of existing content C2. If C1 is a duplicate of existing content C2 already stored at an existing block B1 of non-volatile storage, the VLB entry E14 of the chain of mapping information can be used to access the existing content C2, where E14 can reference or point to B1. If C1 is not a duplicate of any existing content C2 and is therefore new unique content, C1 can be stored in a new data block B2 of non-volatile storage, where E14 can reference or point to B2. Thus, the VLB entry E14 either references the existing data block B1 (e.g., C1 is deduplicated), or references the new data block B2 (e.g., C1 is unique and not deduplicated).

The step 1508 can also include the step 1508c where, in response to updating the MD leaf page stored in the new physical storage location, processing can update one or more entries of one or more MD mid pages which reference the MD leaf page so that such entries of the MD mid pages reference corresponding new physical storage locations of the relocated and updated MD leaf page.

Figure 15:
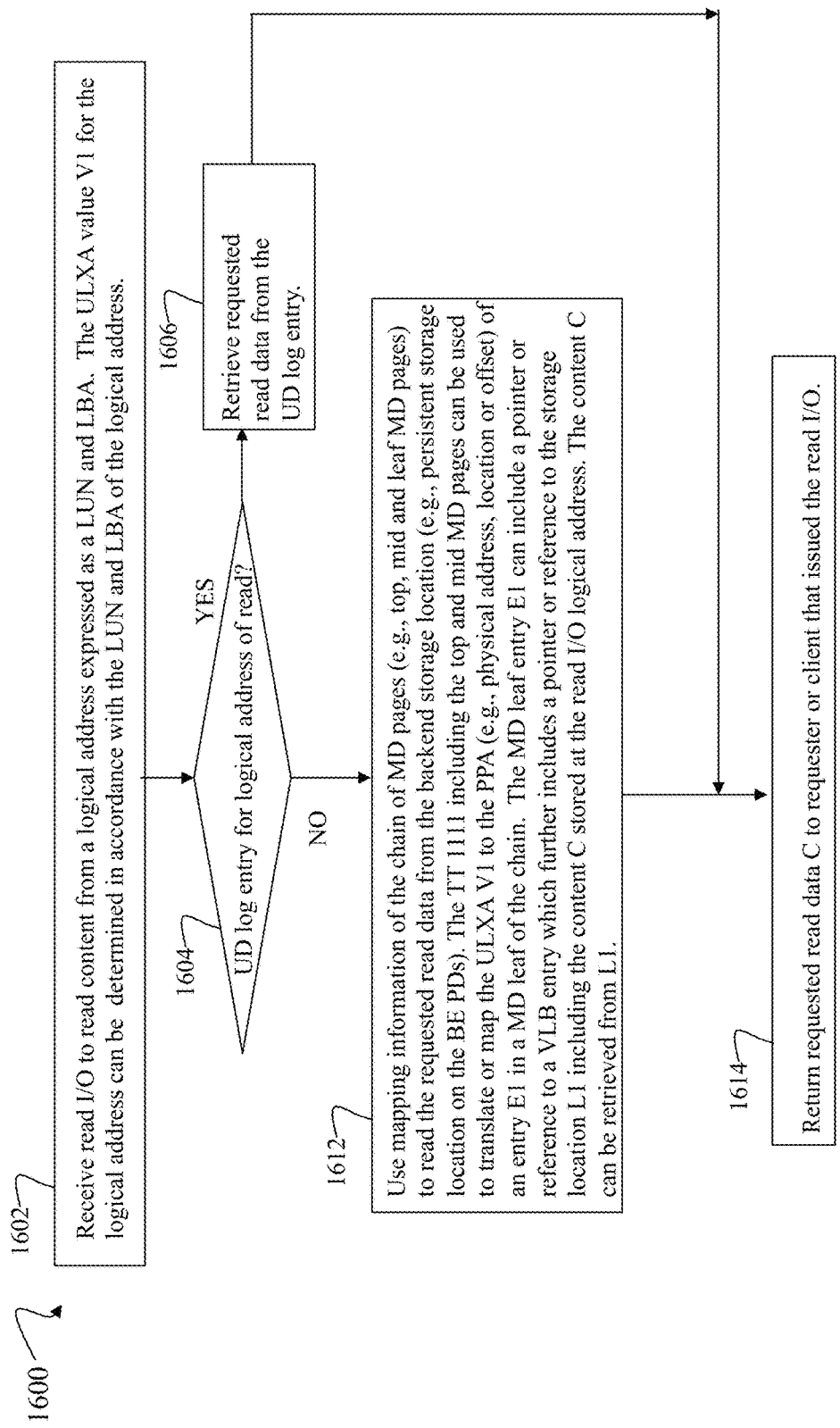

Referring to FIG. 15, shown is a flowchart 1600 of processing steps that can be performed in connection with a read I/O operation in at least one embodiment in accordance with the techniques of the present disclosure.

At the step 1602, a read I/O can be received at a data storage system from a host or other client. The read I/O can be a request to read content from a logical address expressed as a LUN and LBA. The ULXA value V1 for the logical address can be determined in accordance with the LUN and LBA of the logical address. From the step 1602, control proceeds to the step 1604.

At the step 1604, a determination can be made as to whether there is an existing UD log entry for the logical address of the read. If the step 1604 evaluates to yes, control proceeds to the step 1606 where the requested read data C can be retrieved from the UD log entry. From the step 1606, control can proceed to the step 1614. If the step 1604 evaluates to no, control proceeds to the step 1612.

At the step 1612, processing can use the mapping information of the chain of MD pages (e.g., top, mid and leaf MD pages) to read the requested read data from the backend storage location (e.g., persistent storage location on the BE PDs). The TT 1111 including the top and mid MD pages can be used to translate or map the ULXA V1 to the PPA (e.g., physical address, location or offset) of an entry E1 in a MD leaf of the chain. The MD leaf entry E1 can include a pointer or reference to a VLB entry which further includes a pointer or reference to the storage location L1 including the content C stored at the read I/O logical address. The content C can be retrieved from L1. From the step 1612, control proceeds to the step 1614.

At the step 1614, processing can be performed to return the requested read data C to the requester, such as the host or other client that issued the read I/O.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
performing first processing that maintains a first storage tier including a first plurality of metadata (MD pages included in a hierarchical structure, wherein said first processing includes:
determining an updated version of a first MD page of the first plurality of MD pages, wherein an existing version of the first MD page is stored at a first storage location of the first storage tier; and
storing the updated version of the first MD page at the first storage location of the first storage tier; and
performing second processing that maintains a second storage tier including a second plurality of MD pages included in the hierarchical structure, wherein said second processing includes:
determining an updated version of a second MD page of the second plurality of MD pages, wherein an existing version of the second MD page is stored at a second storage location of the second storage tier; and
storing the updated version of the second MD page at a new storage location of the second storage tier, wherein the new storage location denotes a different physical storage location than the second storage location, wherein the hierarchical structure including the first plurality of MD pages and the second plurality of MD pages is used in connection with mapping logical addresses to physical locations or addresses of content stored at the logical addresses, wherein the first plurality of MD pages includes a plurality of MD top pages and a plurality of MD mid pages, wherein the second plurality of MD pages includes a plurality of MD leaf pages, and wherein a first logical address is mapped to a first non-volatile storage location including first content stored at the first logical address, wherein the first logical address is mapped by mapping information including a first chain of MD pages of the hierarchical structure, wherein the first chain includes a first MD top page of the MD top pages, a first MD mid page of the MD mid pages, and a first MD leaf page of the MD leaf pages, wherein a first entry of the first MD top page references a second entry of the first MD mid page, and wherein the second entry references a third entry of the first MD leaf page, and wherein the first MD top page, the first MD mid page and the first MD leaf page are associated with corresponding logical address ranges including the first logical address.

2. The computer-implemented method of claim 1, wherein the first processing manages and maintains the first storage tier in accordance with an update in place policy where each of the first plurality of MD pages is stored at a fixed or static address in the first storage tier, and wherein each updated version of said each MD page is rewritten to the fixed or static address of said each MD page.

3. The computer-implemented method of claim 1, wherein the first storage tier is a configured as a non-parity RAID configuration of one or more RAID groups.

4. The computer-implemented method of claim 3, wherein the first storage tier is configured as a RAID-1 storage tier of one or more RAID-1 groups.

5. The computer-implemented method of claim 1, wherein the second processing manages and maintains the second storage tier in accordance with a log structure system policy where each updated version of each of the second plurality of MD pages is rewritten to an updated physical storage location of the second storage tier, and wherein the updated physical storage location is different from an existing physical storage of the second storage tier where a prior version of said each MD page is stored prior to being updated.

6. The computer-implemented method of claim 1, wherein the second storage tier is a configured as a parity RAID configuration of one or more RAID groups.

7. The computer-implemented method of claim 6, wherein the second storage tier is configured as a RAID-5 storage tier of one or more RAID-5 groups.

8. The computer-implemented method of claim 1, wherein the third entry of the first MD leaf page references a fourth entry of a virtual layer block (VLB), and wherein the fourth entry references the first non-volatile storage location included the first content stored at the first logical address.

9. The computer-implemented method of claim 8, further comprising:
receiving a write I/O operation that writes new content to the first logical address, wherein the write I/O operation overwrites the first content of the first logical address with the new content; and
updating the first chain of MD pages to reference the new content rather than the first content.

10. The computer-implemented method of claim 9, wherein said updating the first chain of MD pages further comprises:
updating an existing version of the first MD leaf page stored at a first existing physical storage location of the second storage tier, wherein said updating the existing version of the first MD leaf page includes updating the third entry of the first MD leaf page to reference another entry of a second VLB used to access the new content rather than the first content;
determining, in accordance with said updating the existing version of the first MD leaf page, an updated version of the first MD leaf page;
storing the updated version of the first MD leaf page at a second new physical storage location of the second storage tier, wherein the second new physical storage location denotes a different physical storage location than the first existing physical storage location in the second storage tier, wherein prior to said storing the updated version of the first MD leaf page, the third entry is located at a third physical storage location of the second storage tier, and after said storing the updated version of the first MD leaf page, the third entry of the first MD leaf page is located at a fourth physical storage location of the second storage tier; and
updating the second entry of the first MD mid page to reference the fourth physical storage location of the second storage tier rather than the third physical storage location of the second storage tier, wherein the fourth physical storage location references the another entry of the second VLB used to access the new content.

11. A system comprising:
one or more processors; and
a memory comprising code stored thereon that, when executed, performs a method comprising:
performing first processing that maintains a first storage tier including a first plurality of metadata (MD) pages included in a hierarchical structure, wherein said first processing includes:
determining an updated version of a first MD page of the first plurality of MD pages, wherein an existing version of the first MD page is stored at a first storage location of the first storage tier; and
storing the updated version of the first MD page at the first storage location of the first storage tier; and
performing second processing that maintains a second storage tier including a second plurality of MD pages included in the hierarchical structure, wherein said second processing includes:
determining an updated version of a second MD page of the second plurality of MD pages, wherein an existing version of the second MD page is stored at a second storage location of the second storage tier; and
storing the updated version of the second MD page at a new storage location of the second storage tier, wherein the new storage location denotes a different physical storage location than the second storage location, wherein the hierarchical structure including the first plurality of MD pages and the second plurality of MD pages is used in connection with mapping logical addresses to physical locations or addresses of content stored at the logical addresses, wherein the first plurality of MD pages includes a plurality of MD top pages and a plurality of MD mid pages, wherein the second plurality of MD pages includes a plurality of MD leaf pages, and wherein a first logical address is mapped to a first non-volatile storage location including first content stored at the first logical address, wherein the first logical address is mapped by mapping information including a first chain of MD pages of the hierarchical structure, wherein the first chain includes a first MD top page of the MD top pages, a first MD mid page of the MD mid pages, and a first MD leaf page of the MD leaf pages, wherein a first entry of the first MD top page references a second entry of the first MD mid page, and wherein the second entry references a third entry of the first MD leaf page, and wherein the first MD top page, the first MD mid page and the first MD leaf page are associated with corresponding logical address ranges including the first logical address.

12. A non-transitory computer readable medium comprising code stored thereon that, when executed, performs a method comprising:

performing first processing that maintains a first storage tier including a first plurality of metadata (MD pages included in a hierarchical structure, wherein said first processing includes:
  determining an updated version of a first MD page of the first plurality of MD pages, wherein an existing version of the first MD page is stored at a first storage location of the first storage tier; and
  storing the updated version of the first MD page at the first storage location of the first storage tier; and
performing second processing that maintains a second storage tier including a second plurality of MD pages included in the hierarchical structure, wherein said second processing includes:
  determining an updated version of a second MD page of the second plurality of MD pages, wherein an existing version of the second MD page is stored at a second storage location of the second storage tier; and
  storing the updated version of the second MD page at a new storage location of the second storage tier, wherein the new storage location denotes a different physical storage location than the second storage location, wherein the hierarchical structure including the first plurality of MD pages and the second plurality of MD pages is used in connection with mapping logical addresses to physical locations or addresses of content stored at the logical addresses, wherein the first plurality of MD pages includes a plurality of MD top pages and a plurality of MD mid pages, wherein the second plurality of MD pages includes a plurality of MD leaf pages, and wherein a first logical address is mapped to a first non-volatile storage location including first content stored at the first logical address, wherein the first logical address is mapped by mapping information including a first chain of MD pages of the hierarchical structure, wherein the first chain includes a first MD top page of the MD top pages, a first MD mid page of the MD mid pages, and a first MD leaf page of the MD leaf pages, wherein a first entry of the first MD top page references a second entry of the first MD mid page, and wherein the second entry references a third entry of the first MD leaf page, and wherein the first MD top page, the first MD mid page and the first MD leaf page are associated with corresponding logical address ranges including the first logical address.

13. The non-transitory computer readable medium of claim 12, wherein the first processing manages and maintains the first storage tier in accordance with an update in place policy where each of the first plurality of MD pages is stored at a fixed or static address in the first storage tier, and wherein each updated version of said each MD page is rewritten to the fixed or static address of said each MD page.

14. The non-transitory computer readable medium of claim 12, wherein the first storage tier is configured as a non-parity RAID configuration of one or more RAID groups.

15. The non-transitory computer readable medium of claim 12, wherein the second processing manages and maintains the second storage tier in accordance with a log structure system policy where each updated version of each of the second plurality of MD pages is rewritten to an updated physical storage location of the second storage tier, and wherein the updated physical storage location is different from an existing physical storage of the second storage tier where a prior version of said each MD page is stored prior to being updated.

16. The non-transitory computer readable medium of claim 12, wherein the second storage tier is a configured as a parity RAID configuration of one or more RAID groups.

17. The non-transitory computer readable medium of claim 12, wherein the method further comprises:
  determining an active data set of one or more volumes of user data; and
  selectively caching, in a cache, a portion of the first plurality of MD pages corresponding to the active data set, wherein a second portion of the first plurality of MD pages corresponds to one or more other volumes of user data, wherein the one or more other volumes are not included in the active data set, and wherein the second portion of the first plurality of MD pages is not stored in the cache.

* * * * *

UNITED STATES PATENT AND TRADEMARK OFFICE
CERTIFICATE OF CORRECTION

PATENT NO. : 12,066,929 B2
APPLICATION NO. : 17/866912
DATED : August 20, 2024
INVENTOR(S) : Vladimir Shveidel et al.

It is certified that error appears in the above-identified patent and that said Letters Patent is hereby corrected as shown below:

In the Claims

Column 50, Line 32:
In Claim 1, the phrase "plurality of metadata (MD"
Should read:
-- plurality of metadata (MD) --

Column 53, Line 10:
In Claim 1, the phrase "plurality of metadata (MD"
Should read:
-- plurality of metadata (MD) --

Signed and Sealed this
First Day of October, 2024

Katherine Kelly Vidal
*Director of the United States Patent and Trademark Office*